US012216373B2

(12) United States Patent
Matsushima

(10) Patent No.: US 12,216,373 B2
(45) Date of Patent: Feb. 4, 2025

(54) VEHICLE DISPLAY DEVICE COMPRISING FIRST AND SECOND VIEWING ANGLE CONTROL PANELS AND A POLARIZATION AXIS ROTATION ELEMENT BETWEEN THE FIRST VIEWING ANGLE CONTROL PANEL AND A DISPLAY PANEL

(71) Applicant: Japan Display Inc., Tokyo (JP)

(72) Inventor: Toshiharu Matsushima, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 18/630,538

(22) Filed: Apr. 9, 2024

(65) Prior Publication Data

US 2024/0272504 A1 Aug. 15, 2024

Related U.S. Application Data

(60) Division of application No. 17/950,104, filed on Sep. 22, 2022, now Pat. No. 11,988,933, which is a
(Continued)

(30) Foreign Application Priority Data

Mar. 25, 2020 (JP) .................................. 2020-054362

(51) Int. Cl.
*G02F 1/137* (2006.01)
*B60K 35/00* (2024.01)
(Continued)

(52) U.S. Cl.
CPC ............ *G02F 1/137* (2013.01); *G02F 1/0136* (2013.01); *G02F 1/133531* (2021.01);
(Continued)

(58) Field of Classification Search
CPC . G02F 1/0136; G02F 1/1396; B60K 2370/25; B60K 2370/33; B60K 2370/1526; B60K 2370/343
See application file for complete search history.

(56) References Cited

U.S. PATENT DOCUMENTS

2004/0252258 A1* 12/2004 Matsushima ....... G02F 1/13471
349/96
2009/0021657 A1* 1/2009 Yang ................... G02F 1/13471
349/96
(Continued)

FOREIGN PATENT DOCUMENTS

JP 2004-133334 A 4/2004
JP 2004-361917 A 12/2004
(Continued)

OTHER PUBLICATIONS

International Search Report and Written Opinion mailed on Mar. 9, 2021, received for PCT Application PCT/JP2021/002303, filed on Jan. 22, 2021, 14 pages including English Translation.

*Primary Examiner* — Paul C Lee
(74) *Attorney, Agent, or Firm* — XSENSUS LLP

(57) ABSTRACT

According to one embodiment, a display device includes a display panel configured to modulate a first polarization component, a first viewing angle control panel including a first liquid crystal layer containing twisted liquid crystal molecules, a second viewing angle control panel including a second liquid crystal layer containing twisted liquid crystal molecules, and a polarization axis rotation element provided between the first viewing angle control panel and the display panel. A second polarization axis of a second polarization component which passed through the first viewing angle control panel is different from a first polarization axis of the
(Continued)

first polarization component. The polarization axis rotation element is configured to rotate the second polarization axis.

6 Claims, 16 Drawing Sheets

Related U.S. Application Data continuation of application No. PCT/JP2021/002303, filed on Jan. 22, 2021.

(51) Int. Cl.
- *G02F 1/01* (2006.01)
- *G02F 1/1335* (2006.01)
- *G02F 1/13363* (2006.01)
- *G02F 1/1347* (2006.01)

(52) U.S. Cl.
CPC ...... *G02F 1/133638* (2021.01); *G02F 1/1347* (2013.01); *B60K 35/00* (2013.01); *B60K 2360/25* (2024.01); *B60K 2360/33* (2024.01)

(56) References Cited

U.S. PATENT DOCUMENTS

| | | | |
|---|---|---|---|
| 2015/0301384 A1 | 10/2015 | Koike et al. | |
| 2018/0321523 A1* | 11/2018 | Robinson | G02F 1/13363 |

FOREIGN PATENT DOCUMENTS

| | | |
|---|---|---|
| JP | 2006-171333 A | 6/2006 |
| JP | 2006-195388 A | 7/2006 |
| JP | 2011-28008 A | 2/2011 |
| JP | 2013-190779 A | 9/2013 |

* cited by examiner

VEHICLE DISPLAY DEVICE COMPRISING FIRST AND SECOND VIEWING ANGLE CONTROL PANELS AND A POLARIZATION AXIS ROTATION ELEMENT BETWEEN THE FIRST VIEWING ANGLE CONTROL PANEL AND A DISPLAY PANEL

CROSS-REFERENCE TO RELATED APPLICATIONS

This application is a divisional application of U.S. patent application Ser. No. 17/950,104, filed on Sep. 22, 2022, which is a continuation application of PCT Application No. PCT/JP2021/002303, filed Jan. 22, 2021, which claims priority from Japanese Patent Application No. 2020-054362, filed Mar. 25, 2020, all of which are incorporated herein in their entireties by reference.

FIELD

Embodiments described herein relate generally to a display device, a vehicle display device and a vehicle.

BACKGROUND

Recently, display devices have been required to vary a viewing angle which can obtain a predetermined contrast ratio. For example, in display devices mounted on vehicles such as automobiles, the viewing angle needs to be controlled such that the display image cannot be seen from the driver seat while driving although the display image can be seen from the passenger seat.

In this use application for controlling the viewing angle, some techniques using a twisted nematic liquid crystal element have been suggested.

DETAILED DESCRIPTION

Figure 1:
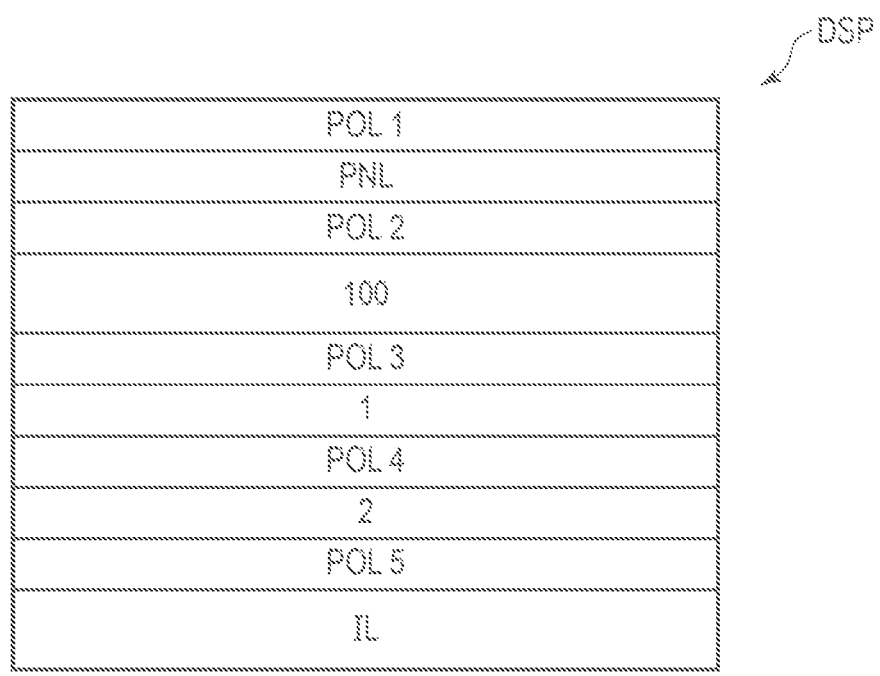
FIG. 1 is a diagram showing a configuration example of a display device DSP according to an embodiment.

In general, according to one embodiment, a display device comprises a display panel configured to modulate a first polarization component, a first viewing angle control panel comprising a first liquid crystal layer containing twisted liquid crystal molecules, a second viewing angle control panel comprising a second liquid crystal layer containing twisted liquid crystal molecules, and a polarization axis rotation element provided between the first viewing angle control panel and the display panel. The first viewing angle control panel is provided between the second viewing angle control panel and the polarization axis rotation element. An alignment state of the first liquid crystal layer is different from an alignment state of the second liquid crystal layer. A second polarization axis of a second polarization component which passed through the first viewing angle control panel is different from a first polarization axis of the first polarization component. The polarization axis rotation element is configured to rotate the second polarization axis.

According to another embodiment, a vehicle display device provided in a vehicle comprises a display panel configured to modulate a first polarization component, a first viewing angle control panel comprising a first liquid crystal layer containing twisted liquid crystal molecules, a second viewing angle control panel comprising a second liquid crystal layer containing twisted liquid crystal molecules, and a polarization axis rotation element provided between the first viewing angle control panel and the display panel. The first viewing angle control panel is provided between the second viewing angle control panel and the polarization axis rotation element. A driver seat and a passenger seat are arranged in a first direction. An alignment state of the first liquid crystal layer is different from an alignment state of the second liquid crystal layer. At least one of a long axis of the liquid crystal molecule located in an intermediate layer of the first liquid crystal layer and a long axis of the liquid crystal molecule located in an intermediate layer of the second liquid crystal layer is aligned in the first direction. A second polarization axis of a second polarization component which passed through the first viewing angle control panel is different from a first polarization axis of the first polarization component. The polarization axis rotation element is configured to rotate the second polarization axis.

According to yet another embodiment, a vehicle comprises a windshield provided in a front part of the vehicle, a driver seat, a passenger seat, a dashboard provided in front of the driver seat and the passenger seat, and a display device provided in the dashboard. The display device comprises a display panel, a first viewing angle control panel configured such that a transmittance on a driver seat side is less than a transmittance on a passenger seat side, and a second viewing angle control panel configured such that a transmittance on a windshield side is less than a transmittance on an opposite side.

Embodiments can provide a display device and a vehicle display device for enabling the control of the viewing angle.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, etc., of the respective parts are illustrated schematically in the drawings, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

FIG. 1 is a diagram showing a configuration example of a display device DSP according to an embodiment.

The display device DSP comprises an illumination device IL, a first viewing angle control panel 1, a second viewing angle control panel 2, a polarization axis rotation element 100, a display panel PNL and first to fifth polarizers POL1 to POL5. The second viewing angle control panel 2 is provided between the illumination device IL and the first viewing angle control panel 1. The first viewing angle control panel 1 is provided between the second viewing angle control panel 2 and the polarization axis rotation element 100. The polarization axis rotation element 100 is provided between the first viewing angle control panel 1 and the display panel PNL.

The first polarizer POL1 is provided on the front side of the display panel PNL (or on the observation location side for observing the display device DSP). The second polarizer POL2 is provided between the polarization axis rotation element 100 and the display panel PNL. The third polarizer POL3 is provided between the first viewing angle control panel 1 and the polarization axis rotation element 100. The fourth polarizer POL4 is provided between the second viewing angle control panel 2 and the first viewing angle control panel 1. The fifth polarizer POL5 is provided on the back side of the second viewing angle control panel 2 (or between the illumination device IL and the second viewing angle control panel 2).

The details of the first viewing angle control panel 1 and the second viewing angle control panel 2 are described later. Both are twisted nematic liquid crystal elements. It should be noted that the second viewing angle control panel 2 may be provided between the first viewing angle control panel 1 and the polarization axis rotation element 100.

Thus, the display device DSP of the present embodiment comprises, between the illumination device IL and the polarization axis rotation element 100, a plurality of types of viewing angle control panels in which the directions for controlling the viewing angle differ from each other.

Figure 2:
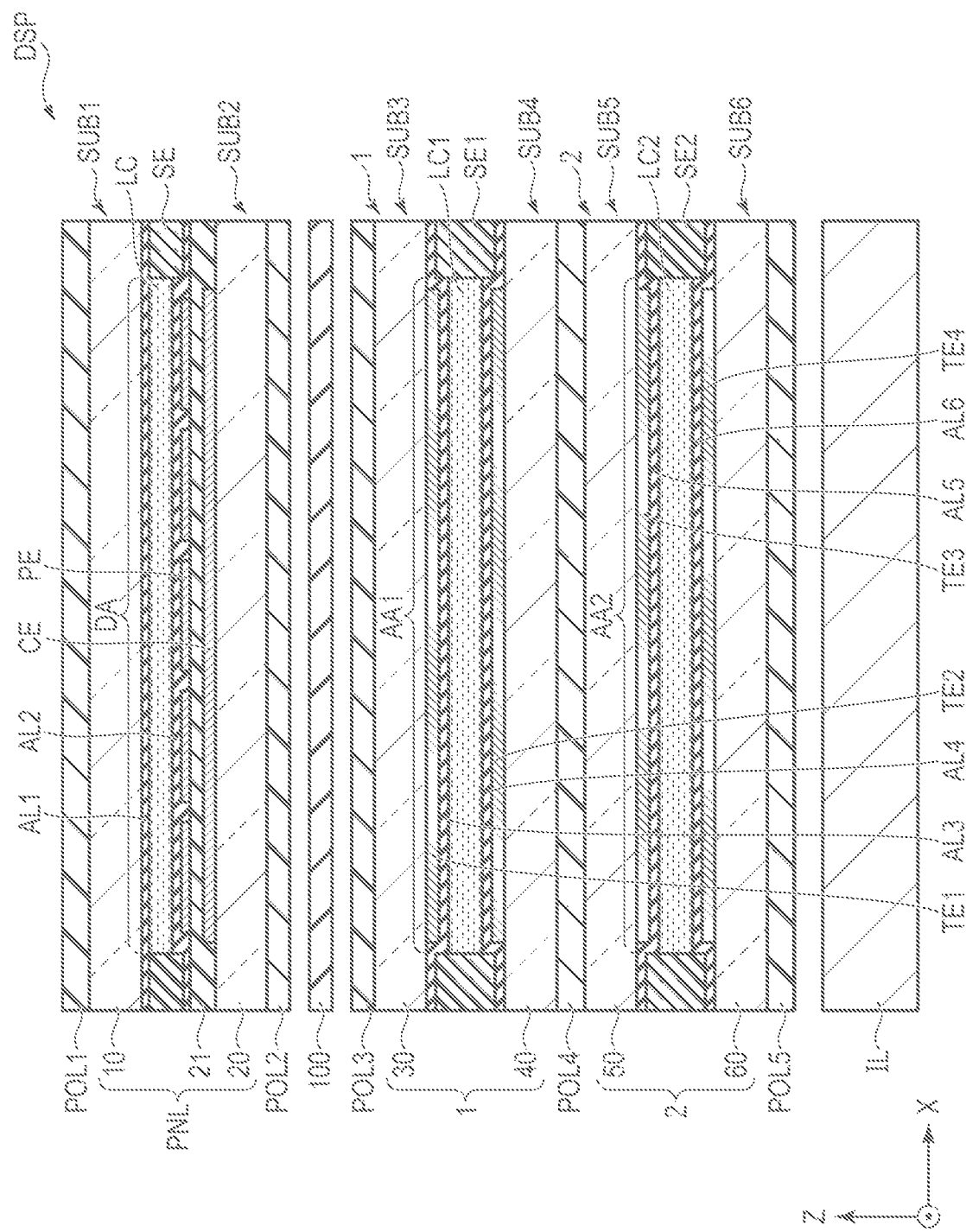
FIG. 2 is a cross-sectional view showing a configuration example of the display device DSP shown in FIG. 1.

FIG. 2 is a cross-sectional view showing a configuration example of the display device DSP shown in FIG. 1. In the figure, a first direction X, a second direction Y and a third direction Z are orthogonal to one another. However, they may intersect one another at an angle other than 90 degrees. For example, the first direction X and the second direction Y are equivalent to directions parallel to the substrates included in the display device DSP. The third direction Z is equivalent to the thickness direction of the display device DSP.

The display panel PNL is, for example, a liquid crystal panel, and comprises a first substrate SUB1, a second substrate SUB2 and a liquid crystal layer LC. The liquid crystal layer LC is held between the first substrate SUB1 and the second substrate SUB2 and is sealed by a sealant SE. For example, the display panel PNL explained here controls the alignment state of the liquid crystal molecules contained in the liquid crystal layer LC by an electric field along the main surface of the substrate. It should be noted that the display panel PNL of the present embodiment is not limited to the example shown in the figure and may control the alignment state of liquid crystal molecules by an electric field along the normal of the main surface of the substrate. Here, the main surface of the substrate are equivalent to the X-Y plane defined by the first direction X and the second direction Y.

The first substrate SUB1 is located on the front side of the second substrate SUB2. The first substrate SUB1 comprises an insulating substrate 10 and an alignment film AL1. The second substrate SUB2 comprises an insulating substrate 20, an insulating film 21, a common electrode CE, a plurality of pixel electrodes PE and an alignment film AL2. The common electrode CE is provided between the insulating substrate 20 and the insulating film 21. The pixel electrodes PE are provided between the insulating film 21 and the alignment film AL2. In a display area DA displaying an image, the pixel electrodes PE overlap a single common electrode CE via the insulating film 21. The pixel electrodes PE and the common electrode CE are controlled to apply voltage to the liquid crystal layer LC. The alignment film AL1 and the alignment film AL2 are in contact with the liquid crystal layer LC.

Here, regarding the display panel PNL, the figure shows only the main elements in a simplified manner. However, the first substrate SUB1 further comprises a light-shielding layer, a color filter layer, an overcoat layer, a spacer, etc. The second substrate SUB2 comprises a plurality of scanning lines, a plurality of signal lines, switching elements electrically connected to the pixel electrodes PE, respectively, various types of insulating films, etc.

The first viewing angle control panel 1 is, for example, a liquid crystal panel, and comprises a third substrate SUB3, a fourth substrate SUB4 and a first liquid crystal layer LC1. The first liquid crystal layer LC1 is held between the third substrate SUB3 and the fourth substrate SUB4 and is sealed by a sealant SE1. As described later, the first liquid crystal layer LC1 contains twisted liquid crystal molecules.

The third substrate SUB3 is located on the front side of the fourth substrate SUB4. The third substrate SUB3 comprises an insulating substrate 30, a first transparent electrode TE1 and an alignment film AL3. The first transparent electrode TE1 is formed over substantially the entire effective area AA1 for controlling the viewing angle and is provided between the insulating substrate 30 and the alignment film AL3. The fourth substrate SUB4 comprises an insulating substrate 40, a second transparent electrode TE2 and an alignment film AL4. The second transparent electrode TE2 is formed over substantially the entire effective area AA1 and is provided between the insulating substrate 40 and the alignment film AL4. The alignment film AL3 and the alignment film AL4 are in contact with the first liquid crystal layer LC1. As described later, the liquid crystal layer LC1 has the optical rotation ability to rotate the polarization axis of a polarization component which is linearly polarized light.

The first transparent electrode TE1 overlaps the second transparent electrode TE2 via the first liquid crystal layer LC1. The first transparent electrode TE1 and the second transparent electrode TE2 are controlled to apply voltage to the first liquid crystal layer LC1.

The second viewing angle control panel 2 is, for example, a liquid crystal panel, and comprises a fifth substrate SUB5, a sixth substrate SUB6 and a second liquid crystal layer LC2. The liquid crystal layer LC2 is held between the fifth substrate SUB5 and the sixth substrate SUB6 and is sealed by a sealant SE2. As described later, the liquid crystal layer LC2 contains twisted liquid crystal molecules. The alignment state of liquid crystal molecules in the second liquid crystal layer LC2 is different from that in the first liquid crystal layer LC1 as described later. A case where the alignment state of liquid crystal molecules differs includes, for example, when the liquid crystal layers are viewed in plan view, a case where a plurality of liquid crystal molecules arranged in the third direction Z are twisted in different rotation directions, a case where the initial alignment direction of the liquid crystal molecules located near the substrate boundary in the liquid crystal layer differs, a case where the initial alignment direction of the liquid crystal molecules located in an intermediate layer in the liquid crystal layer differs, a case where the pretilt angle of liquid crystal molecules differs and a case where the twist angle of liquid crystal molecules differs.

The fifth substrate SUB5 is located on the front side of the sixth substrate SUB6. The fifth substrate SUB5 comprises an insulating substrate 50, a third transparent electrode TE3 and an alignment film AL5. The third transparent electrode TE3 is formed over substantially the entire effective area AA2 for controlling the viewing angle and is provided between the insulating substrate 50 and the alignment film AL5. The sixth substrate SUB6 comprises an insulating substrate 60, a fourth transparent electrode TE4 and an alignment film AL6. The fourth transparent electrode TE4 is formed over substantially the entire effective area AA2 and is provided between the insulating substrate 60 and the alignment film AL6. The alignment film AL5 and the alignment film AL6 are in contact with the second liquid crystal layer LC2. As described later, the second liquid crystal layer LC2 has the optical rotation ability to rotate the polarization axis of a polarization component which is linearly polarized light.

The third transparent electrode TE3 overlaps the fourth transparent electrode TE4 via the second liquid crystal layer LC2. The third transparent electrode TE3 and the fourth transparent electrode TE4 are controlled to apply voltage to the second liquid crystal layer LC2.

Each of the first transparent electrode TE1, the second transparent electrode TE2, the third transparent electrode TE3 and the fourth transparent electrode TE4 is, for example, a single sheet electrode. However, each of them may be divided into a plurality of electrodes along at least one of the first direction X and the second direction Y.

Here, this specification focuses attention on the relationships of the display panel PNL, the first viewing angle control panel 1 and the second viewing angle control panel 2.

The liquid crystal layer LC, the first liquid crystal layer LC1 and the second liquid crystal layer LC2 overlap one another in the third direction Z. The display area DA, the effective area AA1 and the effective area AA2 overlap one another in the third direction Z. The common electrode CE, the pixel electrodes PE, the first transparent electrode TE1, the second transparent electrode TE2, the third transparent electrode TE3 and the fourth transparent electrode TE4 overlap one another in the third direction Z.

The insulating substrates 10, 20, 30, 40, 50 and 60 are transparent substrates such as glass substrates or resin substrates. For example, the insulating substrates 10 and 20 may be glass substrates and the insulating substrates 30 and 40 may be resin substrates. Alternatively, the insulating substrates 10 and 40 may be glass substrates and the insulating substrates 20 and 30 may be resin substrates.

The common electrode CE, the pixel electrodes PE, the first transparent electrode TE1, the second transparent electrode TE2, the third transparent electrode TE3 and the fourth transparent electrode TE4 are transparent electrodes formed of a transparent conductive material such as indium tin oxide (ITO) or indium zinc oxide (IZO). The alignment films AL1 to AL6 are horizontal alignment films having an alignment restriction force substantially parallel to the X-Y plane.

The first polarizer POL1 is attached to the insulating substrate 10. The second polarizer POL2 is attached to the insulating substrate 20. The third polarizer POL3 is attached to the insulating substrate 30. The fourth polarizer POL4 is attached to at least one of the insulating substrate 40 and the insulating substrate 50. The fifth polarizer POL5 is attached to the insulating substrate 60. Each of polarizers POL1 to POL5 comprises an adhesive on one surface of a film formed in advance. However, the polarizers POL1 to POL5 may be directly formed on the surfaces of the insulating substrates.

The polarization axis rotation element 100 may be attached to at least one of the second polarizer POL2 and the third polarizer POL3 or may be integrally formed with the second polarizer POL2 or the third polarizer POL3.

In this display device DSP, the illumination light emitted from the illumination device IL proceeds in the third direction Z, passes through the second viewing angle control panel 2, the first viewing angle control panel 1 and the polarization axis rotation element 100 in series, and subsequently, illuminates the display panel PNL.

More specifically, when the illumination light emitted from the illumination light IL is non-polarized light, the fifth polarizer POL5 transmits a polarization component which is part of the illumination light. The second viewing angle control panel 2 rotates the polarization axis of the polarization component which passed through the fifth polarizer POL5 in the second liquid crystal layer LC2. The polarization component which passed through the second viewing angle control panel 2 passes through the fourth polarizer POL4, and then passes through the first viewing angle control panel 1. In the first liquid crystal layer LC1, the first viewing angle control panel 1 rotates the polarization axis of the polarization component which passed through the fourth polarizer POL4 and transmits a second polarization component. The second polarization component which passed through the first viewing angle control panel 1 passes through the third polarizer POL3, and then passes through the polarization axis rotation element 100.

The display panel PNL is illuminated with the first polarization component which passed through the second polarizer POL2 and modulates the first polarization component in the liquid crystal layer LC.

The second polarization component which passed through the first viewing angle control panel 1 is different from the first polarization component modulated in the display panel PNL. For example, each of the first polarization component and the second polarization component is linearly polarized light comprising a polarization axis in the X-Y plane. In the X-Y plane, when the first direction X is a reference direction, the first polarization component comprises a first polarization axis in a direction making a predetermined angle with the first direction X, and the second polarization component comprises a second polarization axis in a direction different from the first polarization axis relative to the first direction X.

The polarization rotation element 100 rotates the polarization axis of the light which proceeds from the first viewing angle control panel 1 toward the display panel PNL. For example, the polarization axis rotation element 100 is an optical sheet (retardation plate) configured to impart a half-wave retardation to the linearly polarized light which passes through the polarization axis rotation element 100. The polarization axis rotation element 100 may be a single optical sheet or may be a multilayered optical sheet. The polarization axis rotation element 100 should be able to at least exhibit a function of rotating a polarization axis. The polarization axis rotation element 100 is not limited to an optical sheet and may be an element having optical rotation ability such as a twisted nematic liquid crystal element.

In this polarization axis rotation element 100, the second polarization axis of the second polarization component which passed through the first viewing angle control panel 1 and the third polarizer POL3 rotates to conform with the first polarization axis. Thus, the absorption of the illumination light which passed through the first viewing angle control panel 1 into the second polarizer POL2 is suppressed, thereby preventing the decrease in the brightness of the illumination light which reaches the display panel PNL.

Figure 3:
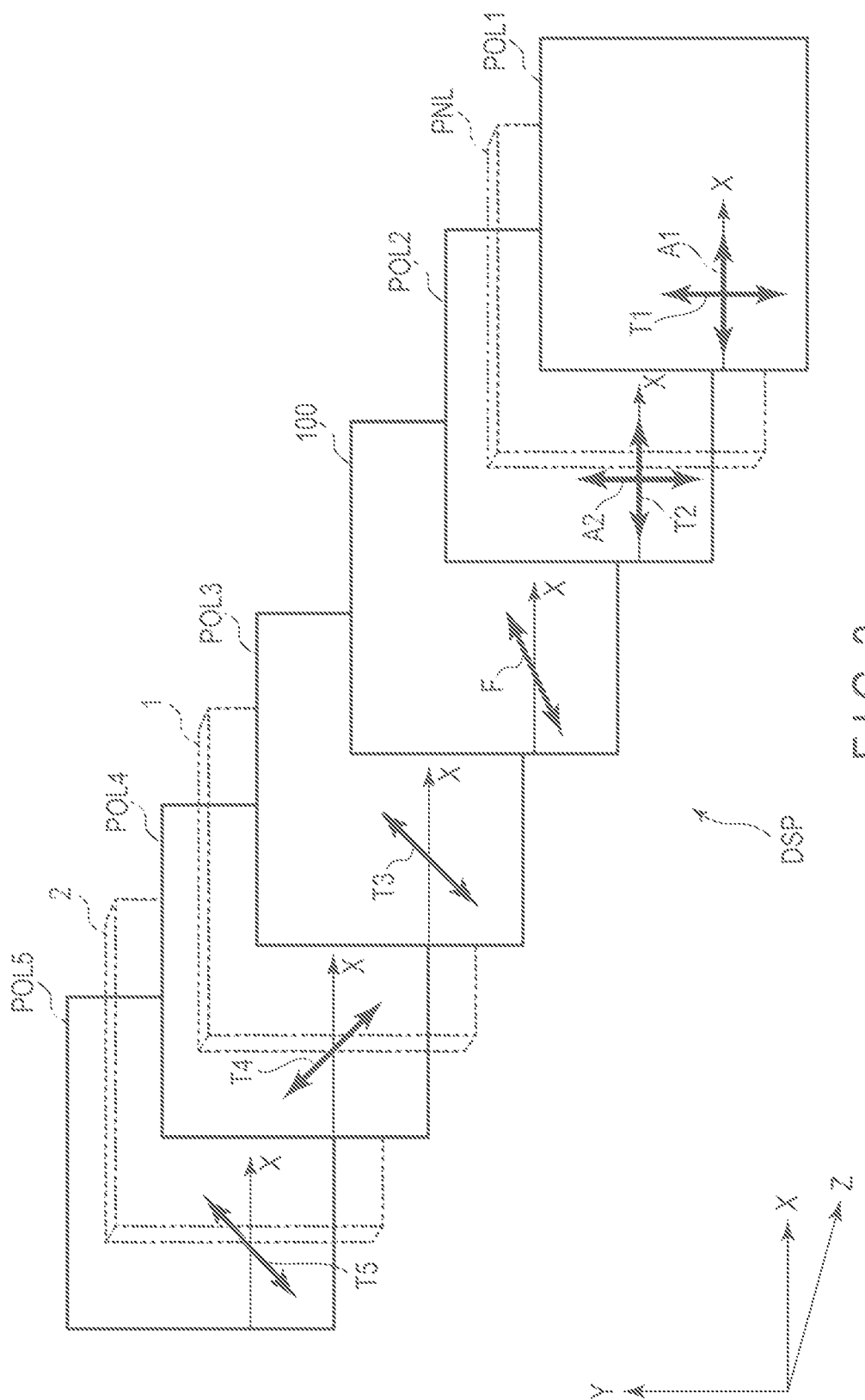
FIG. 3 is a diagram for explaining the axial angle of each of the optical elements constituting the display device DSP.

FIG. 3 is a diagram for explaining the axial angle of each of the optical elements constituting the display device DSP. Here, it is assumed that, in the X-Y plane, the direction of the tip of the arrow indicating the first direction X (X-axis) is a reference direction, and a counterclockwise angle relative to the reference direction is a positive angle.

The first polarizer POL1 comprises a first absorption axis A1 and a first transmission axis T1. The first absorption axis A1 and the first transmission axis T1 are substantially orthogonal to each other. The second polarizer POL2 comprises a second absorption axis A2 and a second transmission axis T2. The second absorption axis A2 and the second transmission axis T2 are substantially orthogonal to each other. The polarization axis rotation element 100 comprises a fast axis F. The third polarizer POL3 comprises a third transmission axis T3. The fourth polarizer POL4 comprises a fourth transmission axis T4. The fifth polarizer POL5 comprises a fifth transmission axis T5.

Although not shown in the figure, the slow axis of the polarization axis rotation element 100 is substantially orthogonal to the fast axis F in the X-Y plane. The absorption axis of the third polarizer POL3 is substantially orthogonal to the third transmission axis T3. The absorption axis of the fourth polarizer POL4 is substantially orthogonal to the fourth transmission axis T4. The absorption axis of the fifth polarizer POL5 is substantially orthogonal to the fifth transmission axis T5.

The first absorption axis A1 is substantially parallel to the first direction X and is located in the direction of 0 degrees. The first transmission axis T1 is located in the direction of 90 degrees. The second absorption axis A2 is substantially orthogonal to the first absorption axis A1 and is located in the direction of 90 degrees. The second transmission axis T2 is substantially orthogonal to the first transmission axis T1 and is located in the direction of 0 degrees. The third transmission axis T3 is located in the direction of 45 degrees. The fourth transmission axis T4 is substantially orthogonal to the third transmission axis T3 and is located in the direction of 135 degrees. The fifth transmission axis T5 is substantially orthogonal to the fourth transmission axis T4 and is located in the direction of 45 degrees. As described above, the second transmission axis T2 is located in a direction different from the third transmission axis T3. Here, the direction of 0 degrees is equivalent to a direction of 0-180 degrees in the X-Y plane. The direction of 90 degrees is equivalent to a direction of 90-270 degrees. The direction of 45 degrees is equivalent to a direction of 45-225 degrees in the Y-Y plane. The direction of 135 degrees is equivalent to a direction of 135-315 degrees in the X-Y plane.

In this display device DSP, when light proceeds in the third direction Z, the linearly polarized light which passed through the fifth polarizer POL5 comprises a polarization axis parallel to the fifth transmission axis T5, and the linearly polarized light which passed through the fourth polarizer POL4 after passing through the second viewing angle control panel 2 comprises a polarization axis parallel to the fourth transmission axis T4. The linearly polarized light (second polarization component) which passed through the third polarizer POL3 after passing through the first viewing angle control panel 1 comprises the second polarization axis parallel to the third transmission axis T3. Thus, the second polarization axis is located in the direction of 45 degrees (or the direction of 45-225 degrees) relative to the X-axis. The linearly polarized light (first polarization component) which passed through the second polarizer POL2 comprises the first polarization axis parallel to the second transmission axis T2. Thus, the first polarization axis is located in the direction of 0 degrees (or the direction of 0-180 degrees or the X-axial direction).

The fast axis F or slow axis of the polarization axis rotation element 100 is located in the intermediate direction between the direction of the first polarization axis and the direction of the second polarization axis in the X-Y plane. Alternatively, the fast axis F or slow axis is located in the intermediate direction between the second transmission axis T2 and the third transmission axis T3. In other words, in the example shown in the figure, the fast axis F or slow axis is located in the direction of 22.5 degrees (or the direction of 22.5-202.5 degrees). Since the polarization axis rotation element 100 is equivalent to a half-wave plate as described above, when the polarization axis of incident light is located in the direction of θ degrees with respect to the fast axis F, the polarization axis rotation element 100 comprises a function of rotating the polarization axis 2×θ degrees. Thus, when the second polarization component which passed through the third polarizer POL3 passes through the polarization axis rotation element 100, the second polarization axis rotates to conform with the first polarization axis. In other words, the second polarization component is converted to the first polarization component in the polarization axis rotation element 100. The first polarization component which passed through the polarization axis rotation element 100 is hardly absorbed in the second polarizer POL2 and illuminates the display panel PNL.

The first polarization component applied to the display panel PNL is appropriately modulated in the liquid crystal layer LC. At least part of the modulated first polarization component passes through the first polarizer POL1, thereby forming a display image. The linearly polarized light which passed through the first polarizer POL1 comprises a polarization axis parallel to the first transmission axis T1. Thus, the polarization axis of the linearly polarized light which passed through the first polarizer POL1 is located in the direction of 90 degrees (or the direction of 90-270 degrees). For this reason, even if the display device DSP is observed via polarized sunglasses, the display image can be seen.

Figure 4:
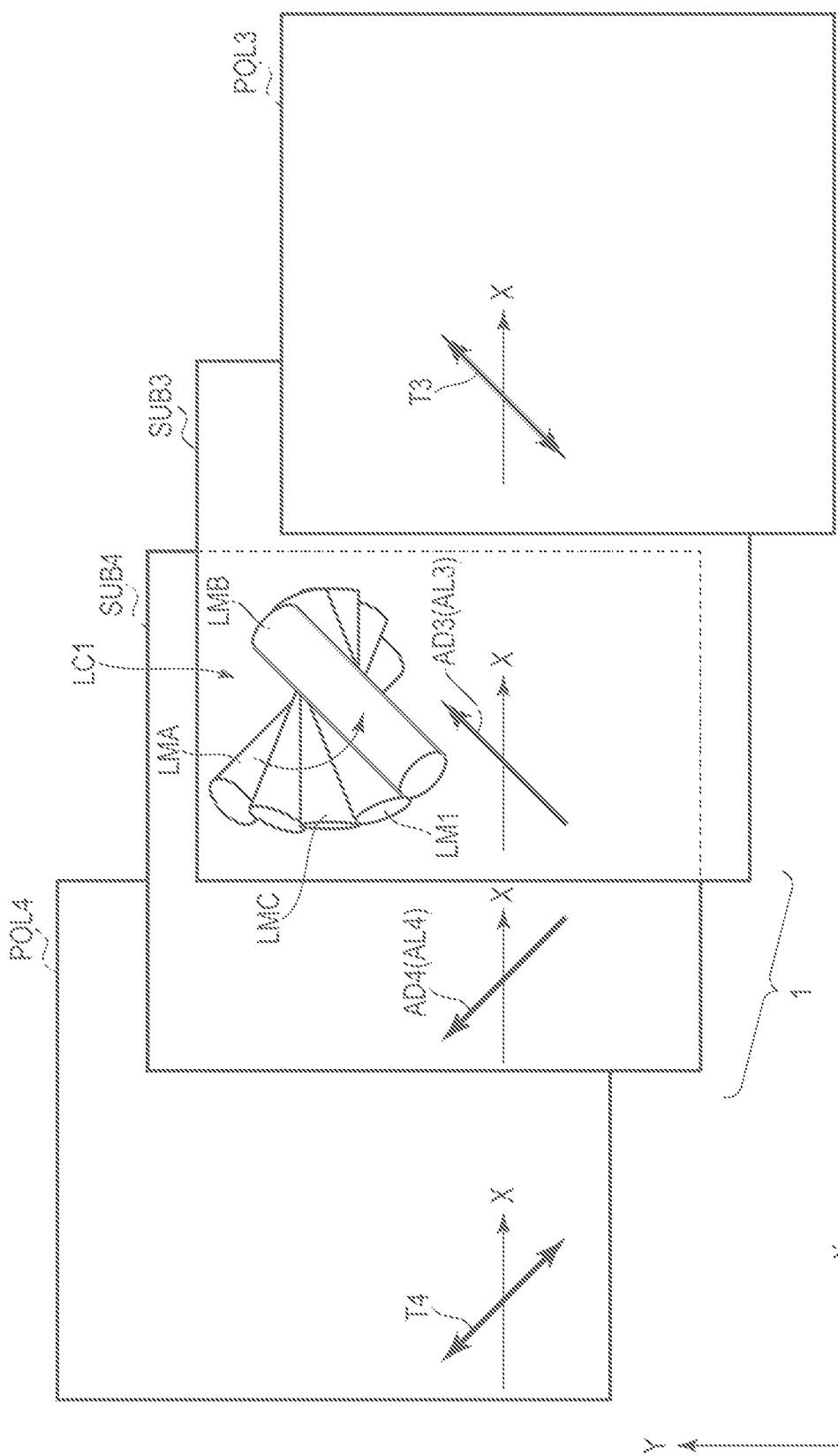
FIG. 4 is a diagram for explaining a configuration example of a first viewing angle control panel 1.

FIG. 4 is a diagram for explaining a configuration example of the first viewing angle control panel 1. Here, the figure shows the initial alignment state of liquid crystal molecules LM1 at an off time when no voltage is applied to the first liquid crystal layer LC1 between the alignment film AL3 and the alignment film AL4.

The alignment treatment direction AD4 of the alignment film AL4 is substantially orthogonal to the alignment treatment direction AD3 of the alignment film AL3. It should be noted that the alignment treatment may be rubbing treatment or optical alignment treatment. However, to drive the liquid crystal molecules LM1 uniformly and smoothly at an on time when voltage is applied to the first liquid crystal layer LC1, the liquid crystal molecule LMA located near the alignment film AL4 and the liquid crystal molecule LMB located near the alignment film AL3 should preferably have a relatively great pretilt angle. To realize this alignment state, rubbing treatment is suitable for the alignment treatment. When the liquid crystal molecules LMA and LMB at an off time are controlled to have a relatively great pretilt angle, optical alignment treatment may be applied.

In the configuration example shown in FIG. 4, the alignment treatment direction AD4 is substantially parallel to the fourth transmission axis T4, and the alignment treatment direction AD3 is substantially parallel to the third transmission axis T3. Thus, the alignment treatment direction AD4 is located in the direction of 135 degrees, and the alignment treatment direction AD3 is located in the direction of 45 degrees. In the first liquid crystal layer LC1, the liquid crystal molecules LM1 arranged in the third direction Z are twisted. A chiral agent is added to the first liquid crystal layer LC1. The liquid crystal molecules LM1 are configured to be twisted counterclockwise from the fourth polarizer POL4 (or the fourth substrate SUB4) toward the third polarizer POL3 (or the third substrate SUB3).

The liquid crystal molecule LMA on a side near the fourth polarizer POL4 and the fourth substrate SUB4 is aligned such that the long axis is parallel to the alignment treatment direction AD4. The liquid crystal molecule LMA is aligned in a direction along the fourth transmission axis T4. Thus, the liquid crystal molecule LMA is aligned in the direction of 135 degrees. In addition, the liquid crystal molecule LMA inclines (pretilts) such that the end of the tip side of the arrow indicating the alignment treatment direction AD4 moves away from the fourth substrate SUB4.

The liquid crystal molecule LMB on a side near the third polarizer POL3 and the third substrate SUB3 is aligned such that the long axis is parallel to the alignment treatment direction AD3. The liquid crystal molecule LMB is aligned in a direction along the third transmission axis T3. Thus, the liquid crystal molecule LMB is aligned in the direction of 45 degrees. In addition, the liquid crystal molecule LMB inclines such that the end of the tip side of the arrow indicating the alignment treatment direction AD3 moves away from the third substrate SUB3 (in other words, such that the end of the rear end side of the arrow indicating the alignment treatment direction AD3 approaches the third substrate SUB3).

The liquid crystal molecule LMC located in substantially the center (intermediate layer) of the first liquid crystal layer LC1 in the third direction Z (thickness direction) is aligned such that the long axis is parallel to the first direction X. The long axis of the liquid crystal molecule LMC is substantially parallel to the first absorption axis A1 of the first polarizer POL1 shown in FIG. 3.

It should be noted that at least one of the alignment treatment direction AD3 and the alignment treatment direction AD4 may be the opposite direction. The alignment treatment direction AD4 and the fourth transmission axis T4 may be located in the direction of 45 degrees. The alignment treatment direction AD3 and the third transmission axis T3 may be located in the direction of 135 degrees. When the liquid crystal molecule LMC is aligned along the first direction X, the liquid crystal molecules LM1 arranged in the third direction Z may be twisted clockwise.

Figure 5:
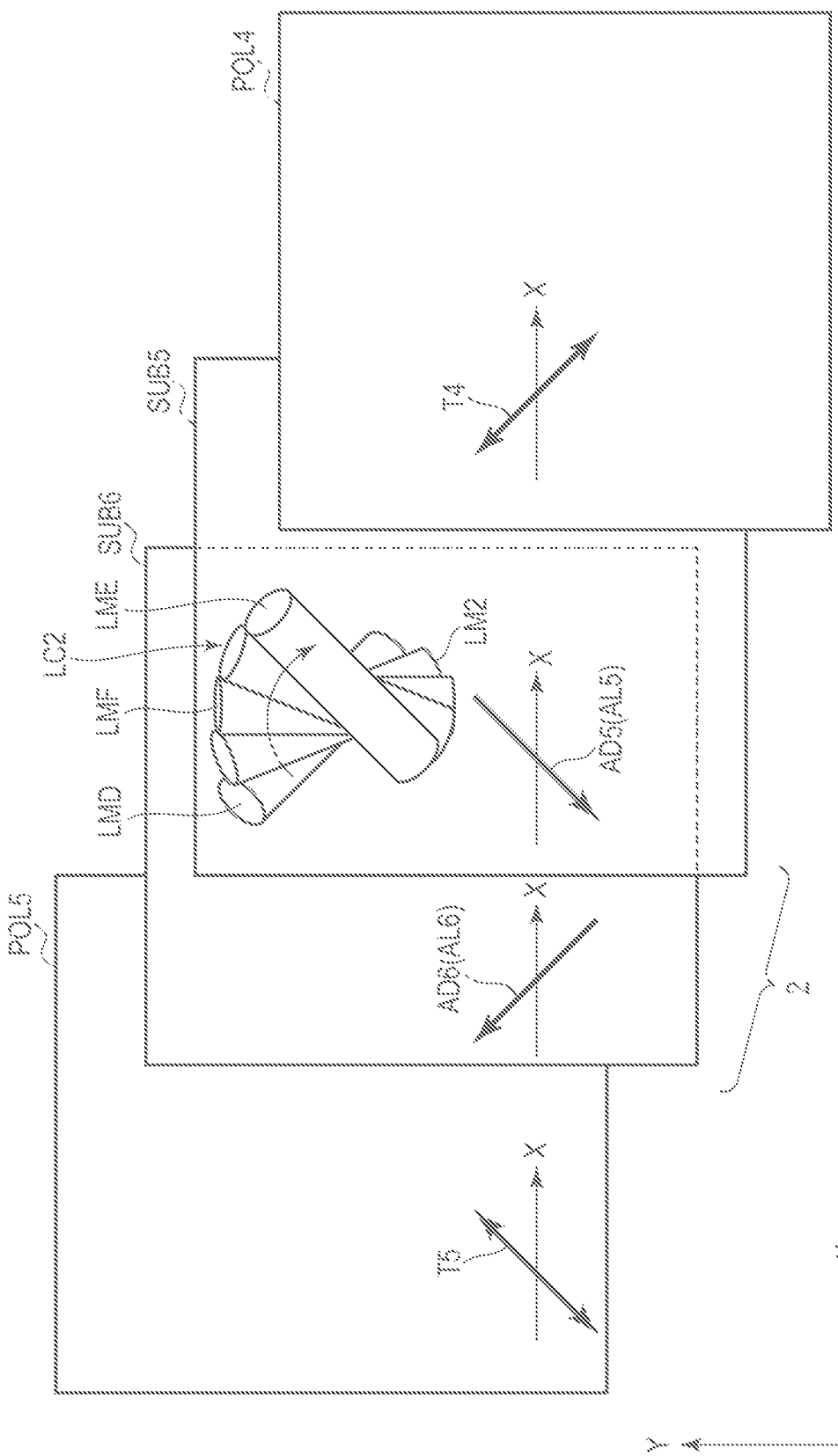
FIG. 5 is a diagram for explaining a configuration example of a second viewing angle control panel 2.

FIG. 5 is a diagram for explaining a configuration example of the second viewing angle control panel 2. Here, the figure shows the initial alignment state of liquid crystal molecules LM2 at an off time when no voltage is applied to the second liquid crystal layer LC2 between the alignment film AL5 and the alignment film AL6.

The alignment treatment direction AD6 of the alignment film AL6 is substantially orthogonal to the alignment treatment direction AD5 of the alignment film AL5. To drive liquid crystal molecules LM2 uniformly and smoothly at an on time when voltage is applied to the second liquid crystal layer LC2, the liquid crystal molecule LMD located near the alignment film AL6 and the liquid crystal molecule LME located near the alignment film AL5 should preferably have a relatively great pretilt angle. To realize this alignment state, rubbing treatment is suitable for the alignment treatment. When the liquid crystal molecules LMD and LME at an off time are controlled to have a relatively great pretilt angle, optical alignment treatment may be applied.

In the configuration example shown in FIG. 5, the alignment treatment direction AD6 is substantially orthogonal to the fifth transmission axis T5, and the alignment treatment direction AD5 is substantially orthogonal to the fourth transmission axis T4. Thus, the alignment treatment direction AD6 is located in the direction of 135 degrees, and the alignment treatment direction AD5 is located in the direction of 225 degrees. In the second liquid crystal layer LC2, the liquid crystal molecules LM2 arranged in the third direction Z are twisted. A chiral agent is added to the second liquid crystal layer LC2. The liquid crystal molecules LM2 are configured to be twisted clockwise from the fifth polarizer POL5 (or the sixth substrate SUB6) toward the fourth polarizer POL4 (or the fifth substrate SUB5). Thus, the liquid crystal molecules LM2 are twisted in a direction different from the liquid crystal molecules LM1 of the first liquid crystal layer LC1. It should be noted that the liquid crystal molecules LM1 of the first liquid crystal layer LC1 and the liquid crystal molecules LM2 of the second liquid crystal layer LC2 may be twisted in the same direction. In this way, both the liquid crystal molecules LM1 and the liquid crystal molecules LM2 may be twisted clockwise or may be twisted counterclockwise.

The liquid crystal molecule LMD on a side near the fifth polarizer POL5 and the sixth substrate SUB6 is aligned such that the long axis is parallel to the alignment treatment direction AD6. The liquid crystal molecule LMD is aligned in a direction substantially orthogonal to the fifth transmission axis T5. Thus, the liquid crystal molecule LMD is aligned in the direction of 135 degrees. The alignment direction of the liquid crystal molecule LMD is substantially parallel to the alignment direction of the liquid crystal molecule LMA in the first liquid crystal layer LC1. In addition, the liquid crystal molecule LMD inclines such that the end of the tip side of the arrow indicating the alignment treatment direction AD6 moves away from the sixth substrate SUB6.

The liquid crystal molecule LME on a side near the fourth polarizer POL4 and the fifth substrate SUB5 is aligned such that the long axis is parallel to the alignment treatment direction AD5. The liquid crystal molecule LME is aligned in a direction substantially orthogonal to the fourth transmission axis T4. Thus, the liquid crystal molecule LME is aligned in the direction of 225 degrees. In addition, the liquid crystal molecule LME inclines such that the end of the tip side of the arrow indicating the alignment treatment direction AD5 moves away from the fifth substrate SUB5 (in other words, such that the end of the rear end side of the arrow indicating the alignment treatment direction AD5 approaches the fifth substrate SUB5).

The liquid crystal molecule LMF located in substantially the center (intermediate layer) of the second liquid crystal layer LC2 in the third direction Z (thickness direction) is aligned such that the long axis is parallel to the second direction Y. The long axis of the liquid crystal molecule LMF is substantially parallel to the first transmission axis T1 of the first polarizer POL1 shown in FIG. 3. Thus, the alignment direction of the liquid crystal molecule LMC in the first liquid crystal layer LC1 is different from that of the liquid crystal molecule LMF in the second liquid crystal layer LC2, and is, for example, orthogonal to that of the liquid crystal molecule LMF.

It should be noted that at least one of the alignment treatment direction AD5 and the alignment treatment direction AD6 may be the opposite direction. The alignment treatment direction AD6 may be located in the direction of 225 degrees, and the alignment treatment direction AD5 may be located in the direction of 135 degrees. When the liquid crystal molecule LMF is aligned parallel to the second direction Y, the liquid crystal molecules LM2 arranged in the third direction Z may be twisted counterclockwise.

In the above configuration example, the illumination light emitted from the illumination device IL is non-polarized light. However, when the illumination light is linearly polarized light, the fifth polarizer POL5 may be omitted. Further, a reflective polarization film which transmits, of the illumination light which is non-polarized light, specific linearly polarized light (for example, a p wave) and reflects other linearly polarized light (for example, an s wave) may be provided. When the illumination light is linearly polarized light comprising a polarization axis of a direction different from the alignment treatment direction AD6, instead of the fifth polarizer POL5, a half-wave plate similar to the polarization axis rotation element 100 should be preferably provided. When the light which passed through the first viewing angle control panel 1 is linearly polarized light having a polarization degree similar to that of the second polarization component, the third polarizer POL3 may be omitted.

Figure 6A:
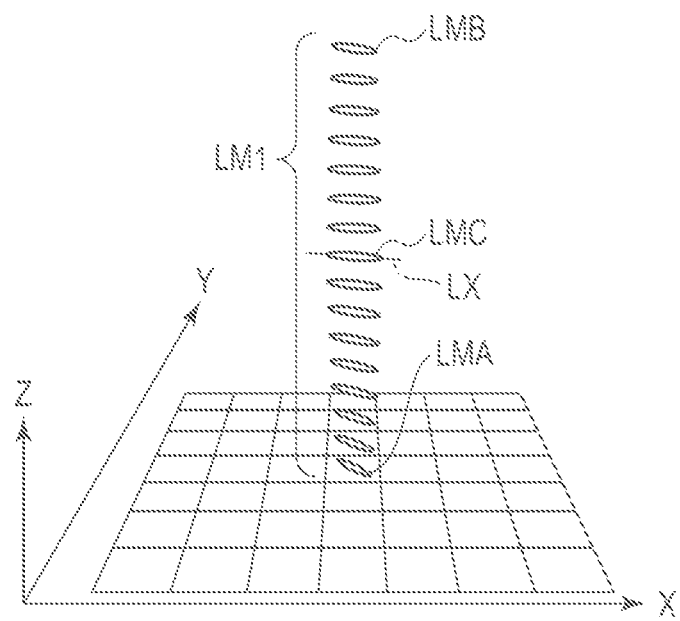
FIG. 6A is a diagram showing the alignment state of liquid crystal molecules LM1.
Figure 6B:
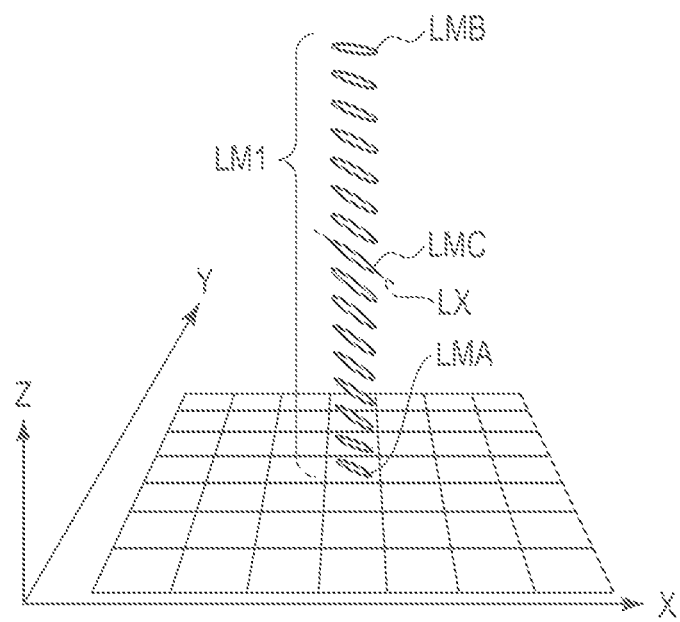
FIG. 6B is a diagram showing the alignment state of the liquid crystal molecules LM1.

FIG. 6A and FIG. 6B are diagrams showing the alignment state of the liquid crystal molecules LM1.

FIG. 6A shows the initial alignment state of the liquid crystal molecules LM1 at an off time when no voltage is applied to the first liquid crystal layer LC1. The long axis LX of the liquid crystal molecule LMC is substantially parallel to the first direction X and is substantially parallel to the X-Y plane. As explained with reference to FIG. 4, etc., in a case where the fourth and third polarizers POL4 and POL3 between which the first viewing angle control panel 1 is interposed are provided in the relationship of crossed-Nicol, a maximum transmittance can be obtained at an off time.

FIG. 6B shows the alignment state of the liquid crystal molecules LM1 at an on time when voltage is applied to the first liquid crystal layer LC1. As the voltage applied to the first liquid crystal layer LC1 is increased, the transmittance is decreased. If the voltage applied to the first liquid crystal layer LC1 when the minimum transmittance is obtained is the maximum voltage, FIG. 6B shows the alignment state when a voltage of approximately half the maximum voltage is applied to the first liquid crystal layer LC1. At this time, the long axis LX of the liquid crystal molecule LMC is substantially parallel to the first direction X and inclines with respect to the X-Y plane.

This first viewing angle control panel 1 at an on time has asymmetry regarding the transmittance in a case where the observation location is inclined to the right side of the figure with respect to the third direction Z (in other words, to the tip side of the arrow indicating the first direction X) and a case where the observation location is inclined to the left side of the figure with respect to the third direction Z (in other words, to the rear end side of the arrow indicating the first direction X).

In a manner similar to that of the first viewing angle control panel 1, the second viewing angle control panel 2 at an on time has asymmetry regarding the transmittance in a case where the observation location is inclined to the tip side of the arrow indicating the second direction Y and a case where the observation location is inclined to the rear end side of the arrow indicating the second direction Y.

These matters are explained with reference to the result of simulation of viewing angle characteristics. The conditions of the simulation explained here are as follows. The illumination light from the illumination device IL is non-polarized light. The first viewing angle control panel 1 is located between the third polarizer POL3 and the fourth polarizer POL4. The second viewing angle control panel 2 is located between the fourth polarizer POL4 and the fifth polarizer POL5. None of the first polarizer POL1, the second polarizer POL2 and the display panel PNL is provided. The wavelength of the transmitted light is 550 nm.

A first mode is equivalent to a state in which the first viewing angle control panel 1 is driven and the second viewing angle control panel 2 is not driven. A second mode is equivalent to a state in which the first viewing angle control panel 1 is not driven and the second viewing angle control panel 2 is driven. A third mode is equivalent to a state in which the first viewing angle control panel 1 and the second viewing angle control panel 2 are driven. In each of the first to third modes, the viewing angle characteristics are simulated.

Figure 7:
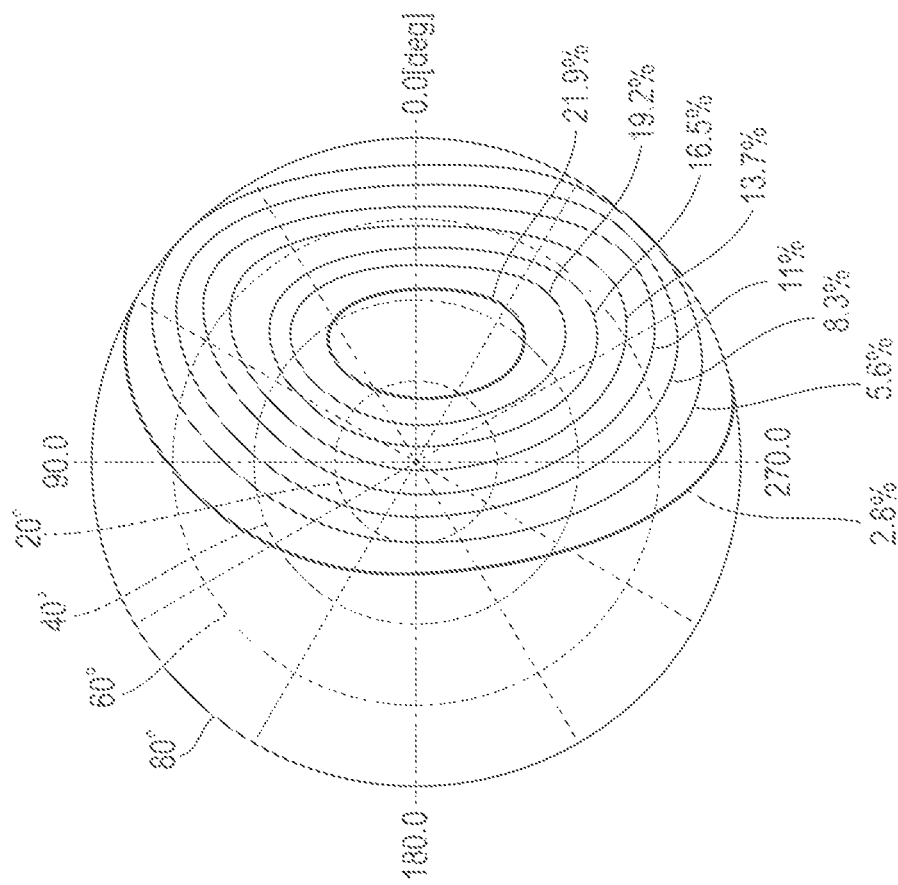
FIG. 7 is a diagram showing the result of simulation of viewing angle characteristics in a first mode.
Figure 7:
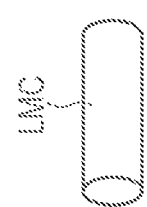

FIG. 7 is a diagram showing the result of simulation of viewing angle characteristics in the first mode. The drive voltage of the first liquid crystal layer LC1 is 2.5 V. The drive voltage of the second liquid crystal layer LC2 is 0 V. Thus, in the first mode, the viewing angle characteristics of the first viewing angle control panel 1 is dominant.

In the figure, the direction of 0 degrees is equivalent to the tip side of the arrow of the first direction X described above. The direction of 180 degrees is equivalent to the rear end side of the arrow of the first direction X. The direction of 90 degrees is equivalent to the tip side of the arrow of the second direction Y. The direction of 270 degrees is equivalent to the rear end side of the arrow of the second direction Y. The center of each concentric circle is equivalent to the normal direction of the first viewing angle control panel 1 (the third direction). In concentric circles in which the center is the normal direction, the tilt angles with respect to the normal are equivalent to 20, 40, 60 and 80 degrees. The characteristic figure shown here is obtained by connecting the areas of equal transmittances with respect to the directions.

As shown in the figure, in a case where the observation location is inclined in the direction of 0 degrees, the transmittance is relatively high. In a case where the observation location is inclined in the direction of 180 degrees, the transmittance is rapidly decreased, and when the tilt angle exceeds 30 degrees, the transmittance is less than or equal to 3%. Thus, the transmittance in the observation location inclined in the direction of 0 degrees is greater than the transmittance in the observation location inclined in the direction of 180 degrees. Regarding an observation location in which the tilt angle exceeds 30 degrees, although transmitted light can be seen (or a display image can be observed) in the observation location inclined in the direction of 0 degrees, transmitted light can be hardly seen (or a display image cannot be observed) in the observation location inclined in the direction of 180 degrees.

Figure 8:
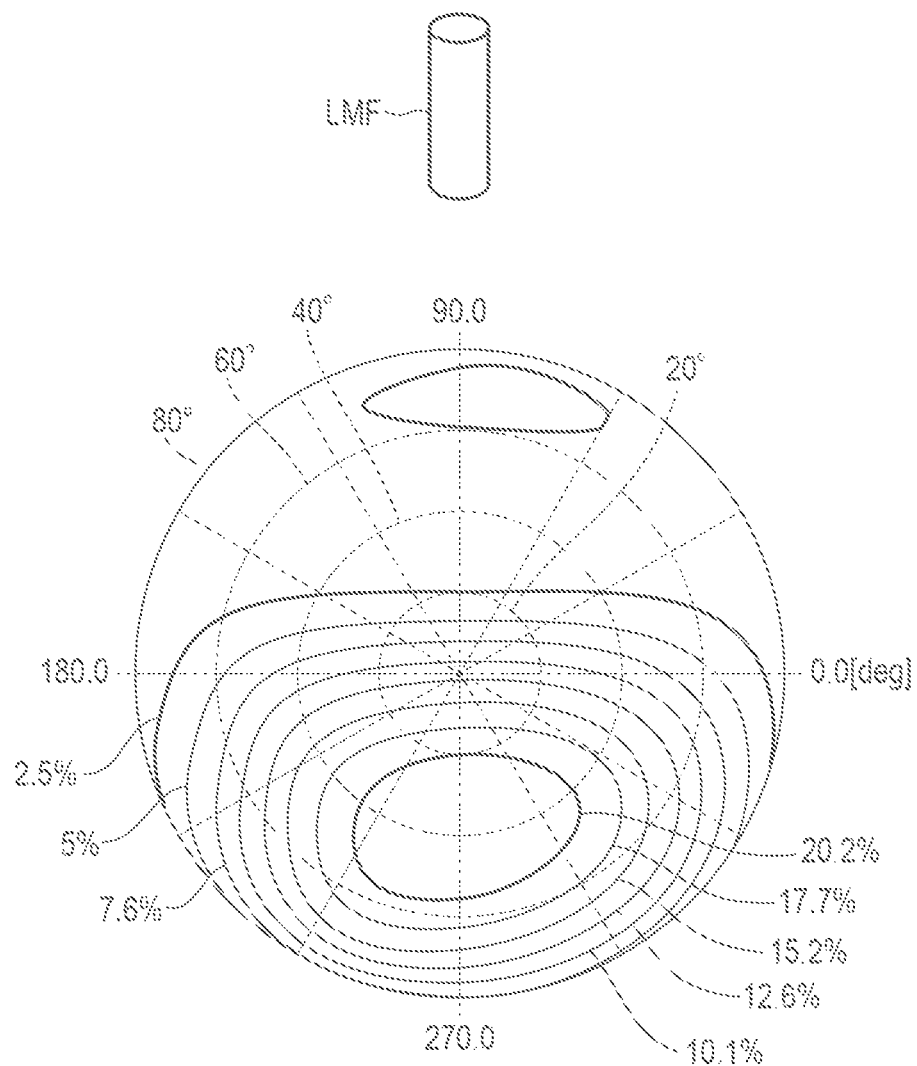
FIG. 8 is a diagram showing the result of simulation of viewing angle characteristics in a second mode.

FIG. 8 is a diagram showing the result of simulation of viewing angle characteristics in the second mode. The drive voltage of the first liquid crystal layer LC1 is 0 V. The drive voltage of the second liquid crystal layer LC2 is 2.5 V. Thus, in the second mode, the viewing angle characteristics of the second viewing angle control panel 2 is dominant.

As shown in the figure, in a case where the observation location is inclined in the direction of 270 degrees, the transmittance is relatively high. In a case where the observation location is inclined in the direction of 90 degrees, the transmittance is rapidly decreased, and when the tilt angle exceeds 20 degrees, the transmittance is less than or equal to 3%. Thus, the transmittance in the observation location inclined in the direction of 270 degrees is greater than the transmittance in the observation location inclined in the direction of 90 degrees. Regarding an observation location in which the tilt angle exceeds 20 degrees, although transmitted light can be seen (or a display image can be observed) in the observation location inclined in the direction of 270 degrees, transmitted light can be hardly seen (or a display image cannot be observed) in the observation location inclined in the direction of 90 degrees.

Figure 9:
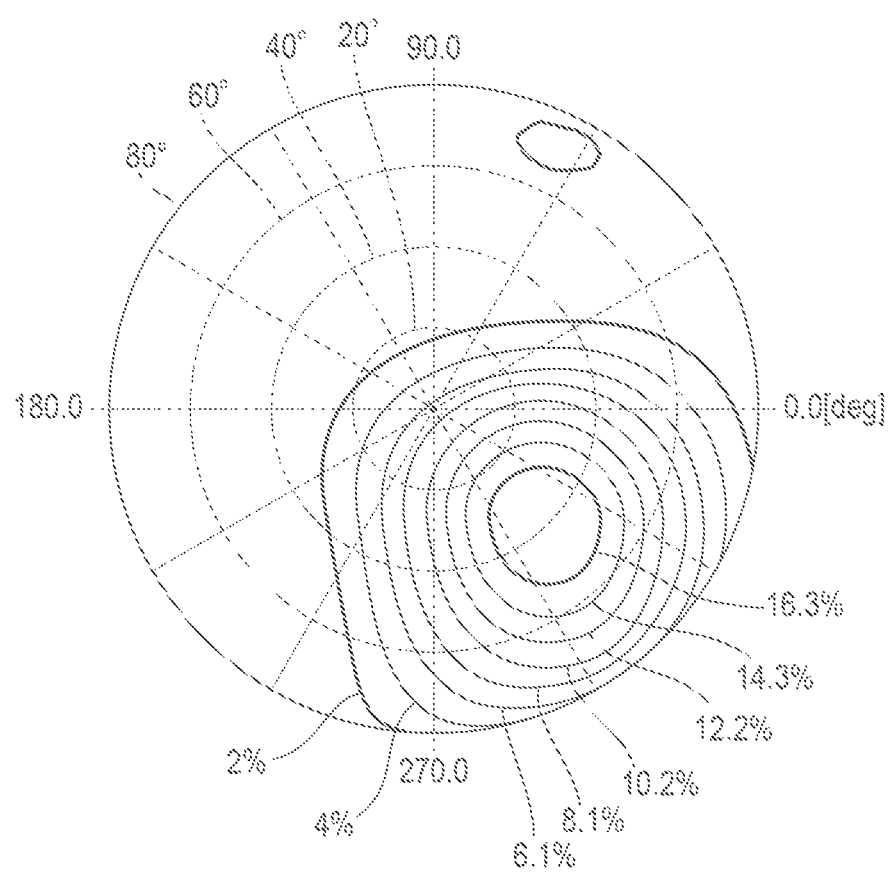
FIG. 9 is a diagram showing the result of simulation of viewing angle characteristics in a third mode.

FIG. 9 is a diagram showing the result of simulation of viewing angle characteristics in the third mode. The drive voltage of the first liquid crystal layer LC1 is 2.5 V. The drive voltage of the second liquid crystal layer LC2 is 2.5 V.

As shown in the figure, in a case where the observation location is inclined in the direction of 0 degrees and the direction of 270 degrees, the transmittance is relatively high. In a case where the observation location is inclined in the direction of 90 degrees and the direction of 180 degrees, the transmittance is rapidly decreased, and when the tilt angle exceeds approximately 20 degrees, the transmittance is less than or equal to 3%. Thus, the transmittance in the observation locations inclined in the direction of 0 degrees and the direction of 270 degrees is greater than the transmittance in the observation locations inclined in the direction of 90 degrees and the direction of 180 degrees. Regarding an observation location in which the tilt angle exceeds 20 degrees, although transmitted light can be seen (or a display image can be observed) in the observation locations inclined in the direction of 0 degrees and the direction of 270 degrees, transmitted light can be hardly seen (or a display image cannot be observed) in the observation locations inclined in the direction of 90 degrees and the direction of 180 degrees.

In the present embodiment, the viewing angle of the display device DSP is controlled by using the first viewing angle control panel 1 and the second viewing angle control panel 2 having the viewing angle characteristics described above.

In the above example, the first viewing angle control panel 1 and the second viewing angle control panel 2 are independently controlled. However, regarding one of the viewing angle control panels, the alignment state of liquid crystal molecules may be fixed in a state where drive voltage is applied. For example, the second viewing angle control panel 2 may be always maintained in a state where the transmittance of the direction of 270 degrees is greater than that of the direction of 90 degrees. In this case, the second viewing angle control panel 2 may be replaced by a film comprising a function equivalent to the second liquid crystal layer LC2 in the above second mode. Such a film can be prepared by a liquid crystal polymer in a predetermined alignment state. When the second viewing angle control panel 2 is replaced by the film, the application of voltage to the liquid crystal layer is not needed, thereby allowing electric power saving.

Figure 10:
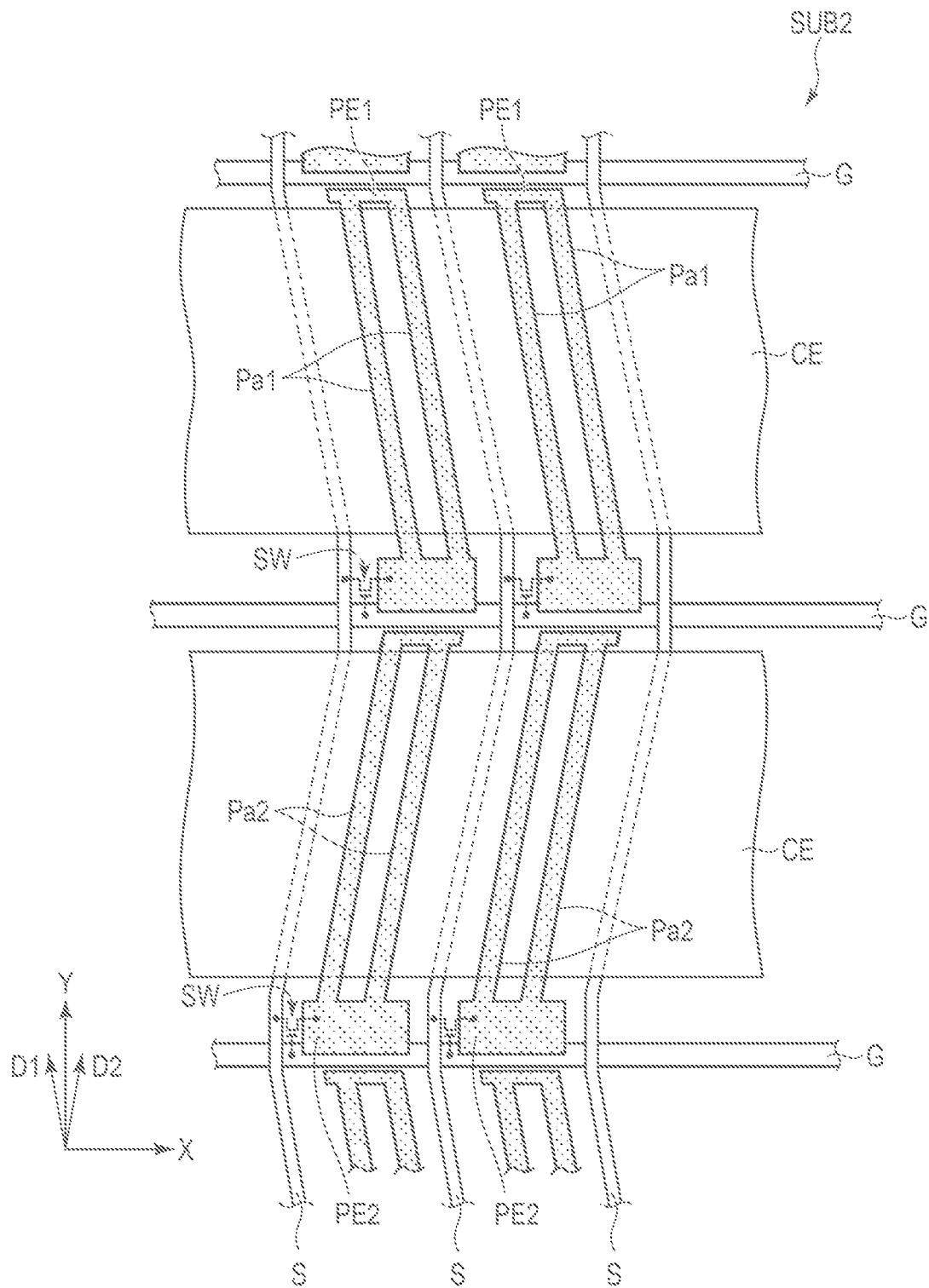
FIG. 10 is a plan view showing an example of a pixel layout in a display panel PNL.

FIG. 10 is a plan view showing an example of a pixel layout in the display panel PNL. Here, the figure shows only the configuration necessary for explanations. The second substrate SUB2 comprises a plurality of scanning lines G, a plurality of signal lines S, a plurality of switching elements SW and pixel electrodes PE1 and PE2. The scanning lines G linearly extend in the first direction X and are arranged at intervals in the second direction Y. The signal lines S extend in substantially the second direction Y and are arranged at intervals in the first direction X. Each switching element SW is electrically connected to one of the scanning lines G and one of the signal lines S. Each of the pixel electrodes PE1 and PE2 is electrically connected to one of the switching elements SW.

The pixel electrodes PE1 are arranged in the first direction X. Each pixel electrode PE1 comprises strip electrodes Pa1 overlapping the common electrode CE. The strip electrodes Pa1 extend in a direction D1 different from the first direction X and the second direction Y.

The pixel electrodes PE2 are arranged in the first direction X. Each pixel electrode PE2 comprises strip electrodes Pa2 overlapping the common electrode CE. The strip electrodes Pa2 extend in a direction D2 different from the direction D1. The number of strip electrodes Pa1 and the number of strip electrodes Pa2 may be one or may be three or more.

Figure 11:
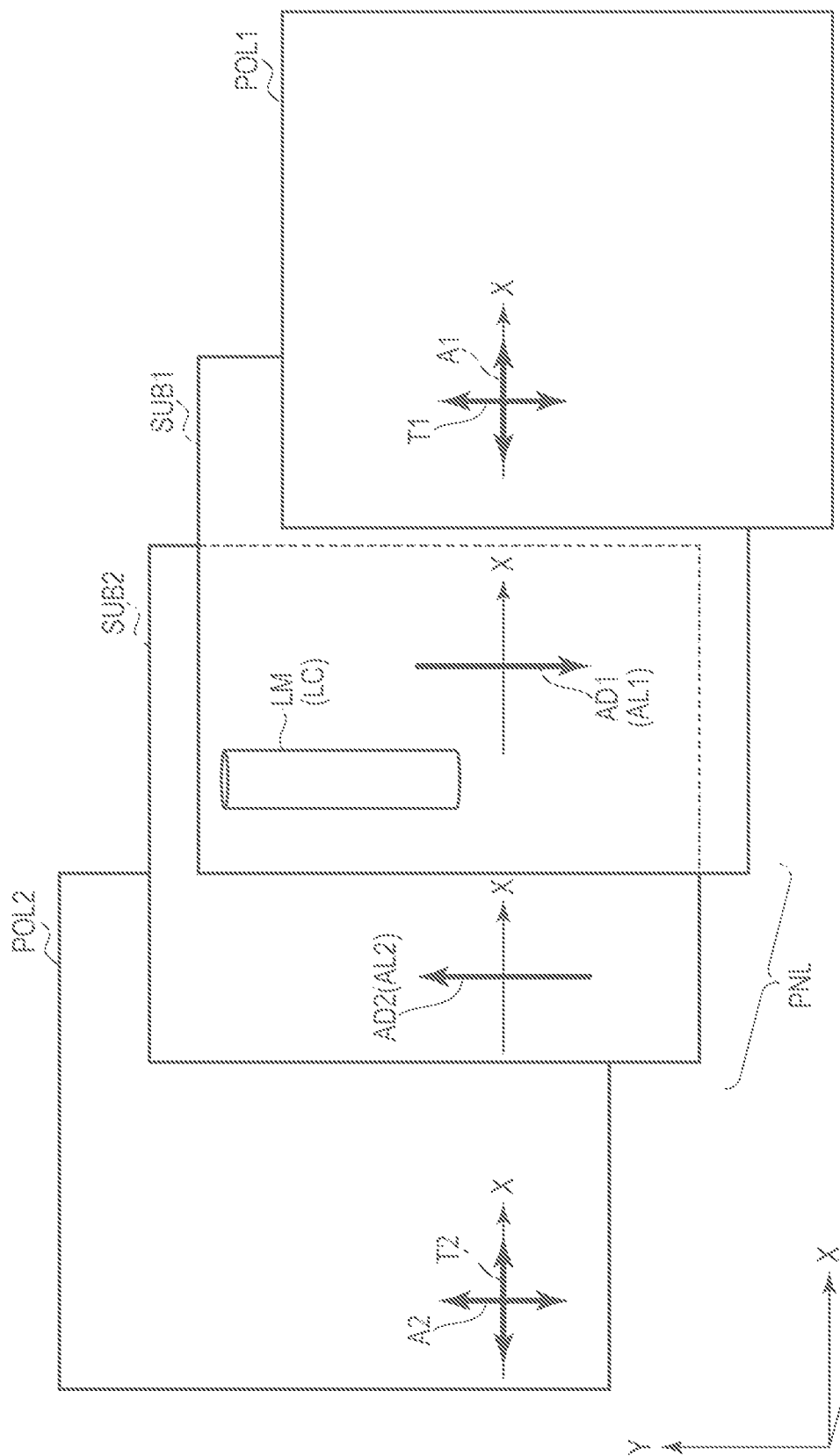
FIG. 11 is a diagram for explaining a configuration example of the display panel PNL.

FIG. 11 is a diagram for explaining a configuration example of the display panel PNL. Here, the figure shows the initial alignment state of liquid crystal molecules LM at an off time when no voltage is applied to the liquid crystal layer LC between the alignment film AL1 and the alignment film AL2.

The alignment treatment direction AD1 of the alignment film AL1 and the alignment treatment direction AD2 of the alignment film AL2 are substantially parallel to each other and the opposite directions. The alignment treatment direction AD1 and the alignment treatment direction AD2 are substantially parallel to, for example, the first transmission axis T1. Thus, in the X-Y plane, the tip of the arrow indicating the alignment treatment direction AD2 is located in the direction of 90 degrees, and the tip of the arrow indicating the alignment treatment direction AD1 is located in the direction of 270 degrees. In the liquid crystal layer LC, the liquid crystal molecules LM arranged in the third direction Z are homogeneously aligned. The liquid crystal molecules LM are aligned such that their long axes are parallel to the second direction Y.

When the light which passed through the polarization axis rotation element 100 is linearly polarized light having a polarization degree similar to that of the first polarization component, the second polarizer POL2 may be omitted. The alignment treatment direction AD1 and the alignment treatment direction AD2 may be substantially orthogonal to the first transmission axis T1. The second transmission axis T2 may be located in the direction of 90 degrees, and the first transmission axis T1 may be located in the direction of 0 degrees. However, as described above, in terms of viewing a display image via polarized sunglasses, as shown in the figure, the first transmission axis T1 should be preferably located in the direction of 90 degrees, and the second transmission axis T2 should be preferably located in the direction of 0 degrees.

Figure 12:
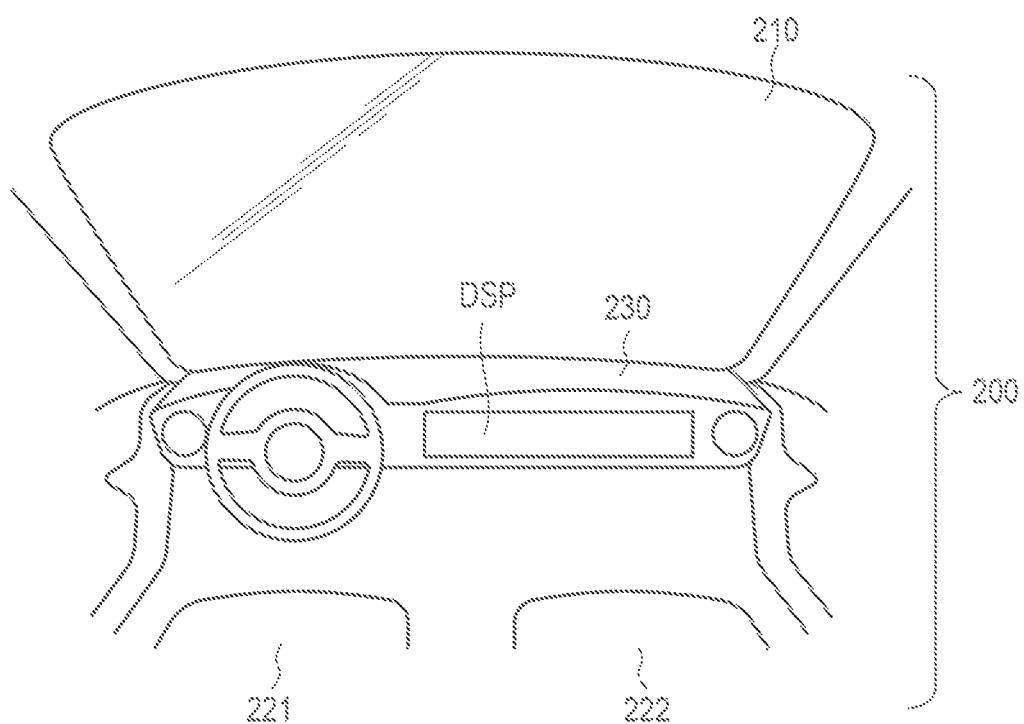
FIG. 12 is a diagram showing an application example of the display device DSP.

FIG. 12 is a diagram showing an application example of the display device DSP. The display device DSP shown in FIG. 12 is equivalent to a vehicle display device mounted in a vehicle 200. The vehicle 200 comprises a windshield 210 provided in the front part of the vehicle, a driver seat 221, a passenger seat 222, a dashboard 230 provided in front of the driver seat 221 and the passenger seat 222, and the display device DSP provided in the dashboard 230. The display device DSP is located in front of the driver seat 221 and the passenger seat 222. In the example shown in the figure, the display device DSP is located substantially right in front of the passenger seat 222 and is located on the diagonally forward right side of the driver seat 221. It is assumed that the driver seat 221 and the passenger seat 222 are arranged in the first direction X explained in the above configuration example. When such a display device DSP is configured by applying the configuration example shown in FIG. 1, the direction of 0 degrees shown in FIG. 7, etc., is equivalent to the direction of the passenger seat side, and the direction of 180 degrees is equivalent to the direction of the driver seat side.

The passenger of the passenger seat 222 is supposed to observe the display device DSP substantially right in front of the display device DSP. At this time, the transmittance of the light which passes through the first viewing angle control panel 1 and the second viewing angle control panel 2 is equivalent to, of the concentric circles shown in FIG. 7 to FIG. 9, the transmittance of a tilt angle of around 0 to 40 degrees. As shown in FIG. 7 to FIG. 9, in the direction of the passenger, a high transmittance can be obtained in all of the first to third modes. Thus, the passenger can see the image displayed in the display panel PNL.

The driver of the driver seat 221 is supposed to observe the display device DSP diagonally. At this time, the transmittance of the light which passes through the first viewing angle control panel 1 and the second viewing angle control panel 2 is equivalent to, of the concentric circles shown in FIG. 7 to FIG. 9, the transmittance of a tilt angle of around 40 to 80 degrees. As shown in FIG. 7 to FIG. 9, in the direction of the driver, the transmittance is less than 2% and is equivalent to substantially a light-shielding state in the first mode or the third mode. Thus, in the first mode or the third mode, the driver cannot see the image displayed in the display panel PNL. The driver can see the image displayed in the display panel PNL when both the first viewing angle control panel 1 and the second viewing angle control panel 2 are in an off state or in the second mode.

As described above, in the first mode, the viewing angle characteristics of the first viewing angle control panel 1 are dominant. As shown in FIG. 7, the transmittance of the driver seat side (the direction of 180 degrees) is less than that of the passenger seat side (the direction of 0 degrees). In the second mode, the viewing angle characteristics of the second viewing angle control panel 2 are dominant. As shown in FIG. 8, the transmittance of the windshield side (the direction of 90 degrees) is less than that of the opposite side (the direction of 270 degrees).

In this way, the viewing angle can be controlled in a plurality of directions for the display device DSP.

Figure 13:
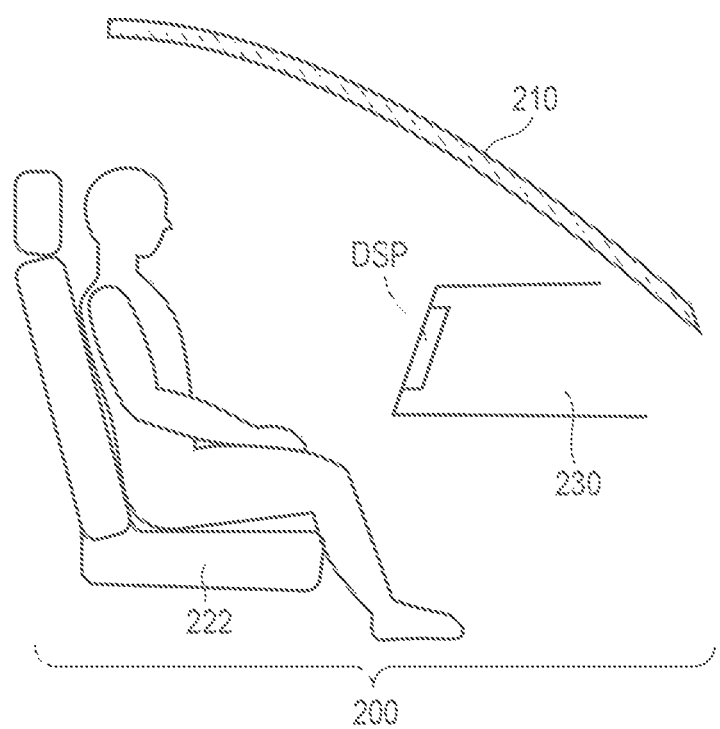
FIG. 13 is a side view of the passenger seat side of the vehicle 200 shown in FIG. 12.

FIG. 13 is a side view of the passenger seat side of the vehicle 200 shown in FIG. 12. The windshield 210 is located above the display device DSP. The direction of the windshield 210 for the display device DSP is equivalent to the direction of 90 degrees shown in FIG. 7, etc.

As shown in FIG. 7 to FIG. 9, the transmittance in the direction of the windshield 210 is less than 2% in the second mode or the third mode and is equivalent to substantially a light-shielding state. Thus, in the second mode or the third mode, an undesirable phenomenon (reflection) in which the image displayed in the display panel PNL is projected on the windshield 210 can be prevented.

Now, another configuration example is explained.

Figure 14:
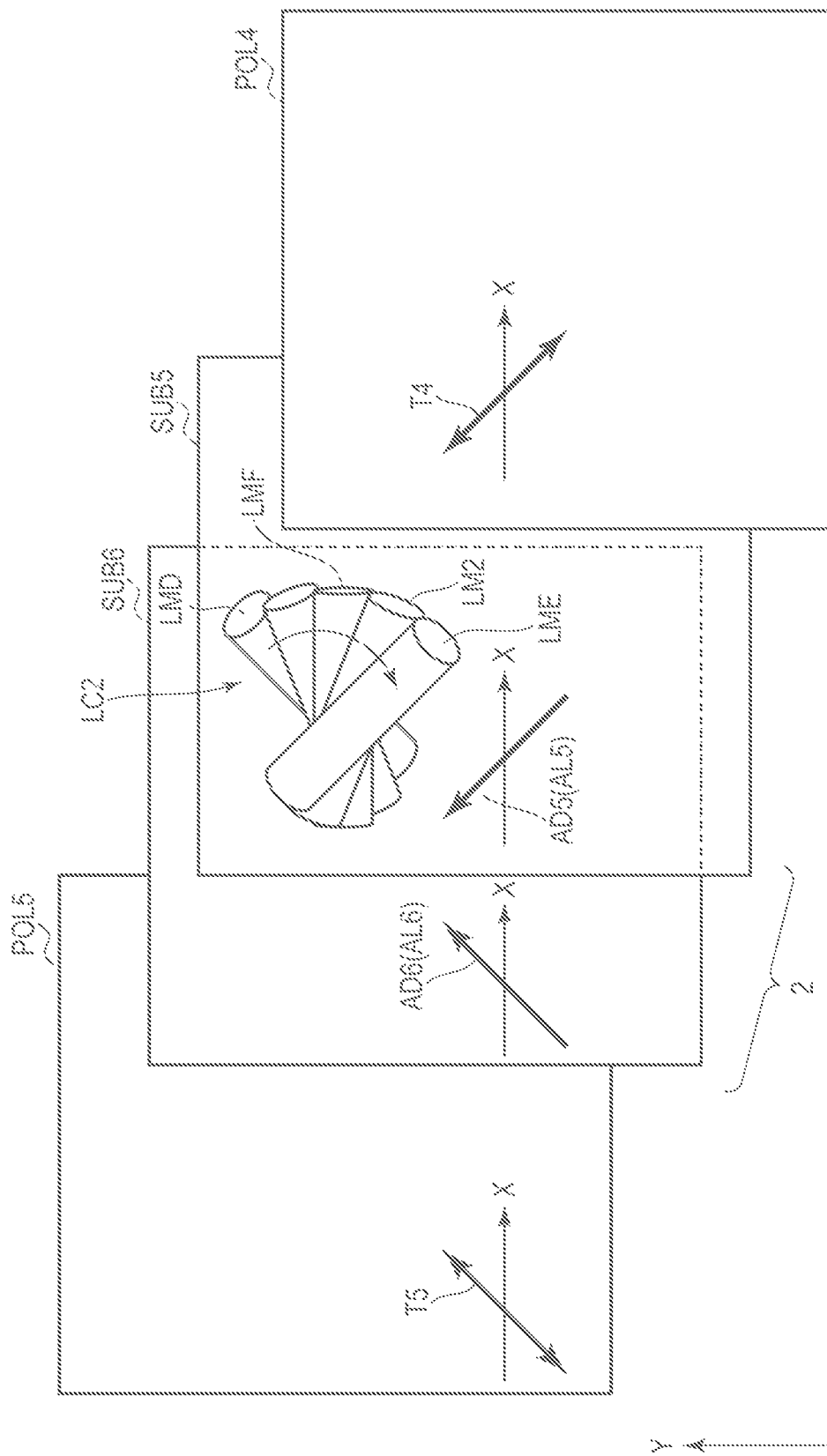
FIG. 14 is a diagram showing another configuration example of the second viewing angle control panel 2.

FIG. 14 is a diagram showing another configuration example of the second viewing angle control panel 2. Here, the figure shows the initial alignment state of the liquid crystal molecules LM2 at an off time when no voltage is applied to the second liquid crystal layer LC2. For example, the second viewing angle control panel 2 shown in FIG. 14 is mounted in the display device DSP in combination with the first viewing angle control panel 1 shown in FIG. 4.

The configuration example shown in FIG. 14 is different from the configuration example shown in FIG. 5 in terms of the alignment state of the liquid crystal molecules LM2. The alignment treatment direction AD6 of the alignment film AL6 is substantially orthogonal to the alignment treatment direction AD5 of the alignment film AL5. The alignment treatment direction AD5 is substantially parallel to the fourth transmission axis T4 and is located in the direction of 135 degrees. The alignment treatment direction AD6 is substantially parallel to the fifth transmission axis T5 and is located in the direction of 45 degrees. In the second liquid crystal layer LC2, the liquid crystal molecules LM2 arranged in the third direction Z are configured to be twisted clockwise from the sixth substrate SUB6 toward the fifth substrate SUB5. Thus, the liquid crystal molecules LM2 are twisted in a direction different from the liquid crystal molecules LM1 of the first liquid crystal layer LC1 shown in FIG. 4.

The liquid crystal molecule LMD on a side near the fifth polarizer POL5 and the sixth substrate SUB6 is aligned such that the long axis is parallel to the alignment treatment direction AD6, and is aligned in the direction of 45 degrees. Thus, the alignment direction of the liquid crystal molecule LMD is substantially orthogonal to the alignment direction of the liquid crystal molecule LMA of the first liquid crystal layer LC1. In addition, the liquid crystal molecule LMD inclines such that the end of the tip side of the arrow indicating the alignment treatment direction AD6 moves away from the sixth substrate SUB6.

The liquid crystal molecule LME on a side near the fourth polarizer POL4 and the fifth substrate SUB5 is aligned such that the long axis is parallel to the alignment treatment direction AD5, and is aligned in the direction of 135 degrees. In addition, the liquid crystal molecule LME inclines such that the end of the tip side of the arrow indicating the alignment
treatment direction AD5 moves away from the fifth substrate SUB5.

The liquid crystal molecule LMF of the intermediate layer of the second liquid crystal layer LC2 is aligned such that the long axis is parallel to the first direction X. The alignment direction of the liquid crystal molecule LMF is substantially parallel to the alignment direction of the liquid crystal molecule LMC in the first liquid crystal layer LC1. These liquid crystal molecules LMC and LMF are aligned parallel to the first absorption axis A1 of the first polarizer POL1 shown in FIG. 3.

The viewing angle characteristics are simulated by combining the above second viewing angle control panel 2 with the first viewing angle control panel 1 explained with reference to FIG. 4.

Figure 15:
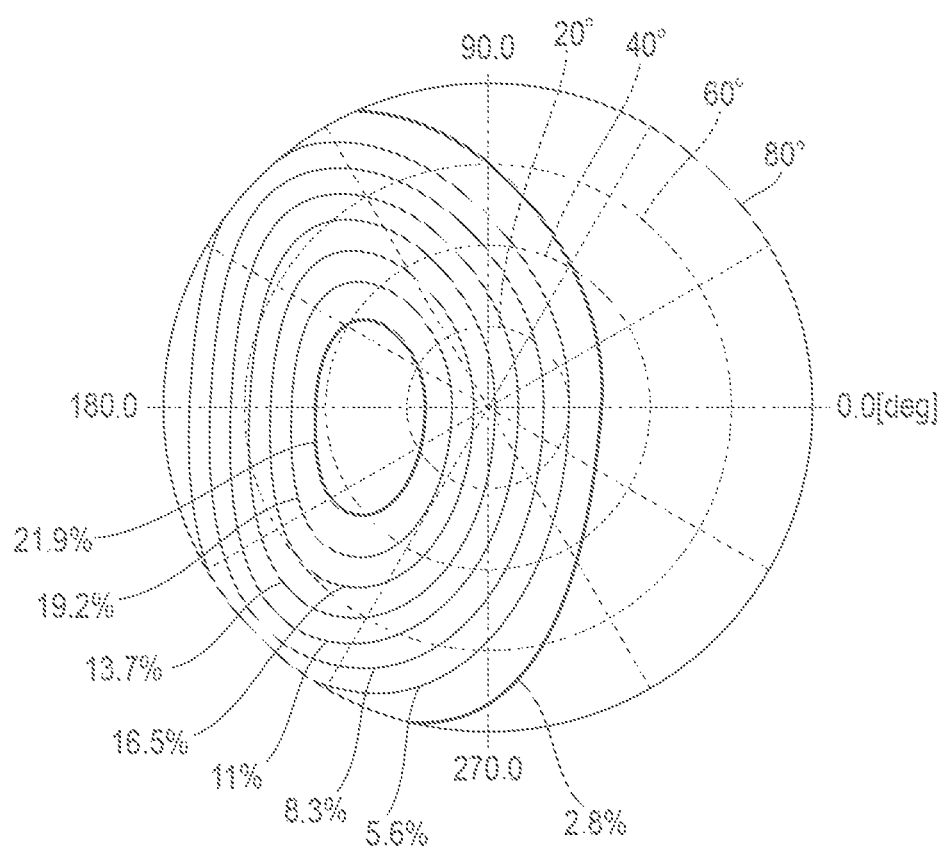
FIG. 15 is a diagram showing the result of simulation of viewing angle characteristics in the second mode.

FIG. 15 is a diagram showing the result of simulation of viewing angle characteristics in the second mode. The drive voltage of the first liquid crystal layer LC1 is 0 V. The drive voltage of the second liquid crystal layer LC2 shown in FIG. 14 is 2.5 V.

As shown in the figure, in a case where the observation location is inclined in the direction of 180 degrees, the transmittance is relatively high. In a case where the observation location is inclined in the direction of 0 degrees, the transmittance is rapidly decreased, and when the tilt angle exceeds 30 degrees, the transmittance is less than or equal to 3%. Thus, the transmittance in the observation location inclined in the direction of 180 degrees is greater than the transmittance in the observation location inclined in the direction of 0 degrees. Regarding an observation location in which the tilt angle exceeds 30 degrees, although transmitted light can be seen (or a display image can be observed) in the observation location inclined in the direction of 180 degrees, transmitted light can be hardly seen (or a display image cannot be observed) in the observation location inclined in the direction of 0 degrees.

The display device DSP in which the first viewing angle control panel 1 shown in FIG. 4 is combined with the second viewing angle control panel 2 shown in FIG. 14 can be applied as the vehicle display device shown in FIG. 12. In this case, in the first mode, although mainly the passenger on the passenger seat side can see the image of the display panel, the driver cannot see the image of the display panel. In the second mode, although mainly the driver can see the image of the display panel, the passenger cannot see the image of the display panel. In this way, the viewing angle of the display device DSP can be controlled.

Figure 16:
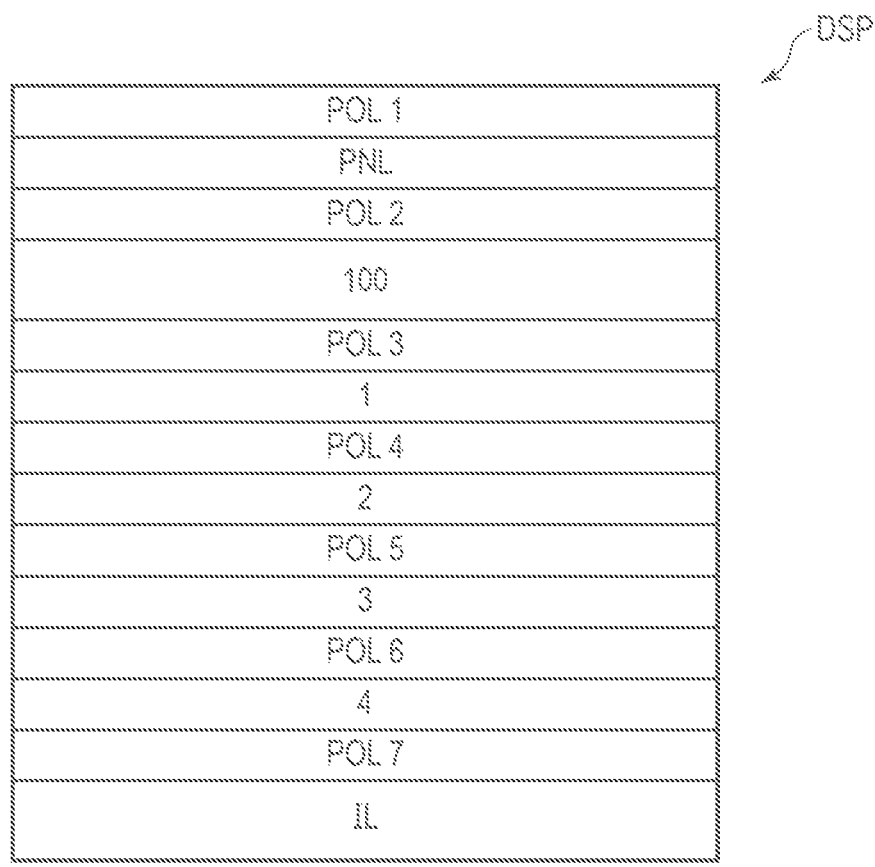
FIG. 16 is a diagram showing another configuration example of the display device DSP.

FIG. 16 is a diagram showing another configuration example of the display device DSP.

The configuration example shown in FIG. 16 is different from the configuration example shown in FIG. 1 in respect that a third viewing angle control panel 3, a fourth viewing angle control panel 4, a sixth polarizer POL6 and a seventh polarizer POL7 are added.

The transmission axis of the sixth polarizer POL6 is parallel to the fourth transmission axis T4 of the fourth polarizer POL4 shown in FIG. 3 and is located in the direction of 135 degrees in the X-Y plane. The transmission axis of the seventh polarizer POL7 is parallel to the fifth transmission axis T5 of the fifth polarizer POL5 shown in FIG. 3 and is located in the direction of 45 degrees in the X-Y plane.

Each of the third viewing angle control panel 3 and the fourth viewing angle control panel 4 is a twisted nematic liquid crystal element. The alignment state of liquid crystal molecules in the liquid crystal layer of the third viewing angle control panel 3 is different from that of the fourth viewing angle control panel 4. The alignment state of liquid crystal molecules in each of the four viewing angle control panels 1 to 4 is explained below.

For example, the liquid crystal molecules LM1 of the first viewing angle control panel 1 are configured to be twisted counterclockwise as shown in FIG. 4. The liquid crystal molecules in the intermediate layer of the liquid crystal layer are aligned in the first direction X.

The liquid crystal molecules LM2 of the second viewing angle control panel 2 are configured to be twisted clockwise as shown in FIG. 5. The liquid crystal molecules in the intermediate layer of the liquid crystal layer are aligned in the second direction Y.

The liquid crystal molecules of the third viewing angle control panel 3 are configured to be twisted clockwise. The liquid crystal molecules in the intermediate layer of the liquid crystal layer are aligned in the first direction X.

The liquid crystal molecules of the fourth viewing angle control panel 4 are configured to be twisted counterclockwise. The liquid crystal molecules in the intermediate layer of the liquid crystal layer are aligned in the second direction Y.

According to this configuration example, the first viewing angle control panel 1 mainly functions to limit the transmittance of the direction of 180 degrees in the X-Y plane. The second viewing angle control panel 2 mainly functions to limit the transmittance of the direction of 90 degrees in the X-Y plane. The third viewing angle control panel 3 mainly functions to limit the transmittance of the direction of 0 degrees in the X-Y plane. The fourth viewing angle control panel 4 mainly functions to limit the transmittance of the direction of 270 degrees in the X-Y plane.

Thus, the viewing angle can be controlled in four directions as four viewing angle control panels 1 to 4 are mounted.

Figure 17:
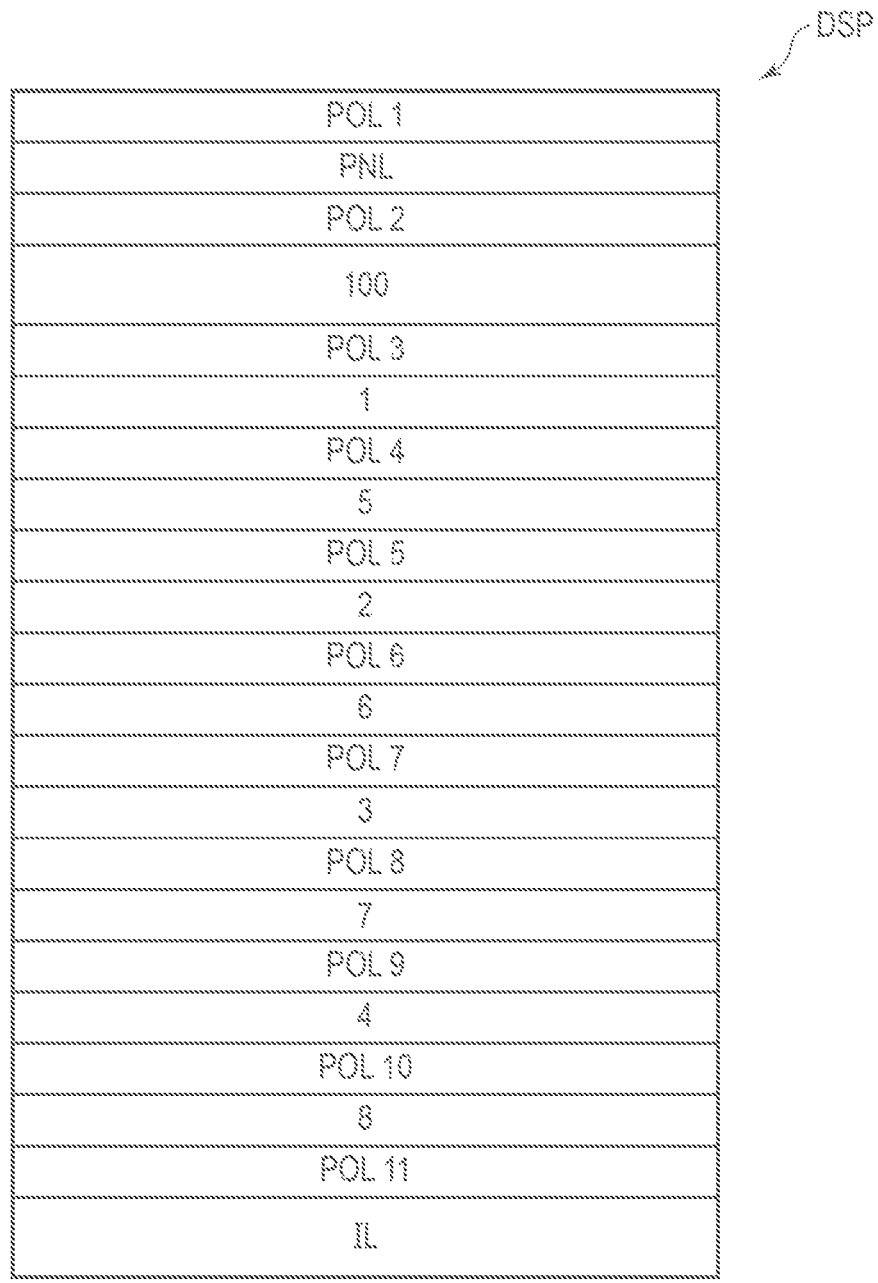
FIG. 17 is a diagram showing another configuration example of the display device DSP.

FIG. 17 is a diagram showing another configuration example of the display device DSP.

The configuration example shown in FIG. 17 is different from the configuration example shown in FIG. 16 in respect that a fifth viewing angle control panel 5, a sixth viewing angle control panel 6, a seventh viewing angle control panel 7, an eighth viewing angle control panel 8, an eighth polarizer POL8, a ninth polarizer POL9, a tenth polarizer POL10 and an eleventh polarizer POL11 are added.

The transmission axis of each of the sixth polarizer POL6, the eighth polarizer POL8 and the tenth polarizer POL10 is parallel to the fourth transmission axis T4 of the fourth polarizer POL4 shown in FIG. 3 and is located in the direction of 135 degrees in the X-Y plane. The transmission axis of each of the seventh polarizer POL7, the ninth polarizer POL9 and the eleventh polarizer POL11 is parallel to the fifth transmission axis T5 of the fifth polarizer POL5 shown in FIG. 3 and is located in the direction of 45 degrees in the X-Y plane.

The fifth viewing angle control panel 5 is a liquid crystal panel similar to the first viewing angle control panel 1. However, the fifth viewing angle control panel 5 is different from the first viewing angle control panel 1 in terms of the retardation of the liquid crystal layer or the drive voltage of the liquid crystal layer. When the drive voltage of the first viewing angle control panel 1 is different from that of the fifth viewing angle control panel 5, the angle range of the viewing angle which can limit visibility can be enlarged compared to the configuration example described above. When the retardation (Δn·d) in the liquid crystal layer of the first viewing angle control panel 1 is different from that of the fifth viewing angle control panel 5, the change of brightness can be adjusted in the case of viewing on the front side and in the case of viewing in a diagonal direction. The combination of the first viewing angle control panel 1 and the fifth viewing angle control panel 5 mainly functions to limit the transmittance in the direction of 180 degrees in the X-Y plane.

Although the sixth viewing angle control panel 6 is a liquid crystal panel similar to the second viewing angle control panel 2, the retardation or drive voltage differs. The combination of the second viewing angle control panel 2 and the sixth viewing angle control panel 6 mainly functions to limit the transmittance in the direction of 90 degrees in the X-Y plane.

Although the seventh viewing angle control panel 7 is a liquid crystal panel similar to the third viewing angle control panel 3, the retardation or drive voltage differs. The combination of the third viewing angle control panel 3 and the seventh viewing angle control panel 7 mainly functions to limit the transmittance in the direction of 0 degrees in the X-Y plane.

Although the eighth viewing angle control panel 8 is a liquid crystal panel similar to the fourth viewing angle control panel 4, the retardation or drive voltage differs. The combination of the fourth viewing angle control panel 4 and the eighth viewing angle control panel 8 mainly functions to limit the transmittance in the direction of 270 degrees in the X-Y plane.

Thus, the control capability of the viewing angle in four directions can be improved as eight viewing angle control panels 1 to 8 are mounted.

As explained above, the present embodiment can provide a display device and a vehicle display device for enabling the control of the viewing angle. The viewing angle can be controlled when the display device is applied to an electronic device such as a notebook personal computer or an amusement device as well as a mobile electronic device such as a mobile telephone. When at least one of the transparent electrodes formed in the first viewing angle control panel and the second viewing angle control panel is divided into a plurality of electrodes, and the voltage applied to each electrode is changed, the viewing angle can be controlled for each area. The transparent electrodes of both the first viewing angle control panel and the second viewing angle control panel may be divided. Regarding an area in which the control of the viewing angle is unnecessary, the transparent electrode may not be provided.

The present invention is not limited to the embodiments described above. The constituent elements of the invention can be modified in various ways without departing from the spirit and scope of the invention. Various aspects of the invention can also be extracted from any appropriate combination of constituent elements disclosed in the embodiments. For example, some of the constituent elements disclosed in the embodiments may be deleted. Furthermore, the constituent elements described in different embodiments may be arbitrarily combined.

What is claimed is:

1. A vehicle display device provided in a vehicle, comprising:
   a display panel configured to modulate a first polarization component;
   a first viewing angle control panel comprising a first liquid crystal layer containing twisted liquid crystal molecules;
   a second viewing angle control panel comprising a second liquid crystal layer containing twisted liquid crystal molecules;
   a polarization axis rotation element provided between the first viewing angle control panel and the display panel;
   a first polarizer provided on a front side of the display panel;
   a second polarizer provided between the display panel and the polarization axis rotation element; and
   a third polarizer provided between the polarization axis rotation element and the first viewing angle control panel, wherein
   the first viewing angle control panel is provided between the second viewing angle control panel and the polarization axis rotation element,
   a driver seat and a passenger seat are arranged in a first direction,
   an alignment state of the first liquid crystal layer is different from an alignment state of the second liquid crystal layer,
   at least one of a long axis of the liquid crystal molecule located in an intermediate layer of the first liquid crystal layer and a long axis of the liquid crystal molecule located in an intermediate layer of the second liquid crystal layer is aligned in the first direction,
   a second polarization axis of a second polarization component which passed through the first viewing angle control panel is different from a first polarization axis of the first polarization component,
   the polarization axis rotation element is configured to rotate the second polarization axis,
   the second polarizer comprises a second transmission axis which transmits the first polarization component,
   the third polarizer comprises a third transmission axis which transmits the second polarization component, and
   a fast axis or slow axis of the polarization axis rotation element is located in an intermediate direction between a direction of the second transmission axis and a direction of the third transmission axis.

2. The vehicle display device of claim 1, wherein the polarization axis rotation element is configured to impart a half-wave retardation to the second polarization component.

3. The vehicle display device of claim 1, wherein an alignment direction of the liquid crystal molecule located in the intermediate layer of the first liquid crystal layer is substantially orthogonal to an alignment direction of the liquid crystal molecule located in the intermediate layer of the second liquid crystal layer.

4. The vehicle display device of claim 1, wherein an alignment direction of the liquid crystal molecule located in the intermediate layer of the first liquid crystal layer is substantially parallel to an alignment direction of the liquid crystal molecule located in the intermediate layer of the second liquid crystal layer.

5. A vehicle comprising:
a windshield provided in a front part of the vehicle;
a driver seat and a passenger seat;
a dashboard provided in front of the driver seat and the passenger seat; and
a display device provided in the dashboard, wherein
the display device comprises:
   a display panel;
   a polarization axis rotation element;
   a first viewing angle control panel configured such that a transmittance on a driver seat side is less than a transmittance on a passenger seat side;
   a second viewing angle control panel configured such that a transmittance on a windshield side is less than a transmittance on an opposite side;
   a first polarizer provided on a front side of the display panel;
   a second polarizer provided between the display panel and the polarization axis rotation element; and
   a third polarizer provided between the polarization axis rotation element and the first viewing angle control panel,
the polarization axis rotation element is provided between the first viewing angle control panel and the display panel,
the display panel is configured to modulate a first polarization component, a second polarization axis of a second polarization component which passed through the first viewing angle control panel is different from a first polarization axis of the first polarization component, the second polarizer comprises a second transmission axis which transmits the first polarization component, the third polarizer comprises a third transmission axis which transmits the second polarization component, and a fast axis or slow axis of the polarization axis rotation element is located in an intermediate direction between a direction of the second transmission axis and a direction of the third transmission axis.

6. The vehicle of claim 5, wherein the display device further comprises an illumination device, the first viewing angle control panel and the second viewing angle control panel are provided between the illumination device and the polarization axis rotation element, the first viewing angle control panel comprises a first liquid crystal layer containing a twisted liquid crystal molecule, the second viewing angle control panel comprises a second liquid crystal layer containing a twisted liquid crystal molecule, an alignment state of the first liquid crystal layer is different from an alignment state of the second liquid crystal layer, and the polarization axis rotation element is configured to rotate the second polarization axis.

* * * * *